US008229041B2

(12) United States Patent
Desai

(10) Patent No.: US 8,229,041 B2
(45) Date of Patent: Jul. 24, 2012

(54) DIRECT DETECTION OF WIRELESS INTERFERERS IN A COMMUNICATION DEVICE FOR MULTIPLE MODULATION TYPES

(75) Inventor: Prasanna Desai, Elfin Forest, CA (US)

(73) Assignee: Broadcom Corporation, Irvine, CA (US)

( * ) Notice: Subject to any disclaimer, the term of this patent is extended or adjusted under 35 U.S.C. 154(b) by 315 days.

(21) Appl. No.: 12/684,765

(22) Filed: Jan. 8, 2010

(65) Prior Publication Data
US 2010/0303183 A1     Dec. 2, 2010

Related U.S. Application Data

(60) Provisional application No. 61/181,067, filed on May 26, 2009, provisional application No. 61/263,072, filed on Nov. 20, 2009.

(51) Int. Cl.
*H04L 27/06* (2006.01)

(52) U.S. Cl. ........ 375/343; 375/130; 375/142; 375/143; 375/144; 375/148; 375/150; 375/152; 375/316; 375/340; 375/346; 375/350; 455/63.1; 455/67.13; 455/114.2; 455/296; 455/501; 329/349; 329/353

(58) Field of Classification Search .................. 375/130, 375/142, 143, 144, 148, 150, 152, 316, 340, 375/343, 346, 350; 455/63.1, 67.13, 114.2, 455/296, 501; 370/335, 342; 329/349, 353
See application file for complete search history.

(56) References Cited

U.S. PATENT DOCUMENTS

| | | | |
|---|---|---|---|
| 5,353,307 A | 10/1994 | Lester | |
| 5,692,006 A | 11/1997 | Ross | |
| 5,722,062 A | 2/1998 | Nakanishi | |
| 5,822,363 A | 10/1998 | Le Roy | |
| 5,960,028 A | 9/1999 | Okamoto | |
| 6,526,264 B2 | 2/2003 | Sugar | |

(Continued)

FOREIGN PATENT DOCUMENTS

| | | |
|---|---|---|
| EP | 675606 A1 | 10/1995 |
| EP | 1083622 A2 | 3/2001 |
| WO | 0051260 A1 | 8/2000 |

OTHER PUBLICATIONS

Electronics Letter—Feb. 19, 1998, vol. 34 No. 4.
Nada Golmie, Nicolas Chevrollier and Olivier Rebala, Bluetooth and WLAN Coexistence: Challenges and Solutions, IEEE Wireless Communications, Dec. 2003, pp. 22-29.

(Continued)

*Primary Examiner* — Leon Flores
(74) *Attorney, Agent, or Firm* — Garlick & Markison; Shayne X. Short

(57) ABSTRACT

Direct detection of wireless interferers in a communication device for multiple modulation types. One or more radios implemented within a communication device is/are operative to receive and process wireless communications. A wireless communication signal is processed to extract symbols there from. Various symbols groups are processed in accordance with correlation processing to identify potential interferers (e.g., other communication devices using common portions of frequency spectra). Alternatively, matched filter processing (e.g., using a Barker matched filter in some embodiments) operates on the various symbol groups to identify some potential interferers. Various combinations of correlation processing and matched filter processing may be employed in other instances (e.g., using any of a desired means of comparison, combining, etc.) in considering interferers identified in accordance with each of these two means. Also, re-identification and re-characterization of possible interferers may be performed subsequently to remove or re-admit frequency spectra for use in communications.

20 Claims, 16 Drawing Sheets

U.S. PATENT DOCUMENTS

| | | | |
|---|---|---|---|
| 6,888,812 | B1 | 5/2005 | Iwasaki |
| 7,031,671 | B2 | 4/2006 | Mottier |
| 2001/0041584 | A1 | 11/2001 | Watanabe |
| 2003/0078011 | A1 | 4/2003 | Cheng |
| 2004/0180622 | A1 | 9/2004 | Godfrey |
| 2004/0258174 | A1 | 12/2004 | Shao |
| 2005/0233710 | A1 | 10/2005 | Lakkis |
| 2006/0171445 | A1* | 8/2006 | Batra et al. .................... 375/130 |
| 2008/0137566 | A1 | 6/2008 | Marholev |
| 2008/0139151 | A1 | 6/2008 | Ojo |
| 2008/0207156 | A1* | 8/2008 | Aytur et al. .................. 455/307 |
| 2008/0298450 | A1* | 12/2008 | Zhang et al. ................. 375/227 |

OTHER PUBLICATIONS

Draft Recommended Practice for Information Technology-Telecommunications and Information Exchange Between Systems—Local and Metropolitan Area Networks Specific Requirements, Part 15.2: Coexistence of Wireless Personal Area Networks with Other Wireless Devices Operating in Unlicensed Frequency Bands, IEEE, Standards Activities Department, Standard Licensing and Contracts, IEEE P802.15.2/Draft #05, Mar. 15, 2002, pp. 1-98.

Brian P. Crow. Indra Widjaja, Jeong Geun Kim, and Prescott T. Sakai, IEEE 802.11 Wireless Local Area Networks, IEEE Communications Magazine, Sep. 1997, pp. 116-126.

* cited by examiner

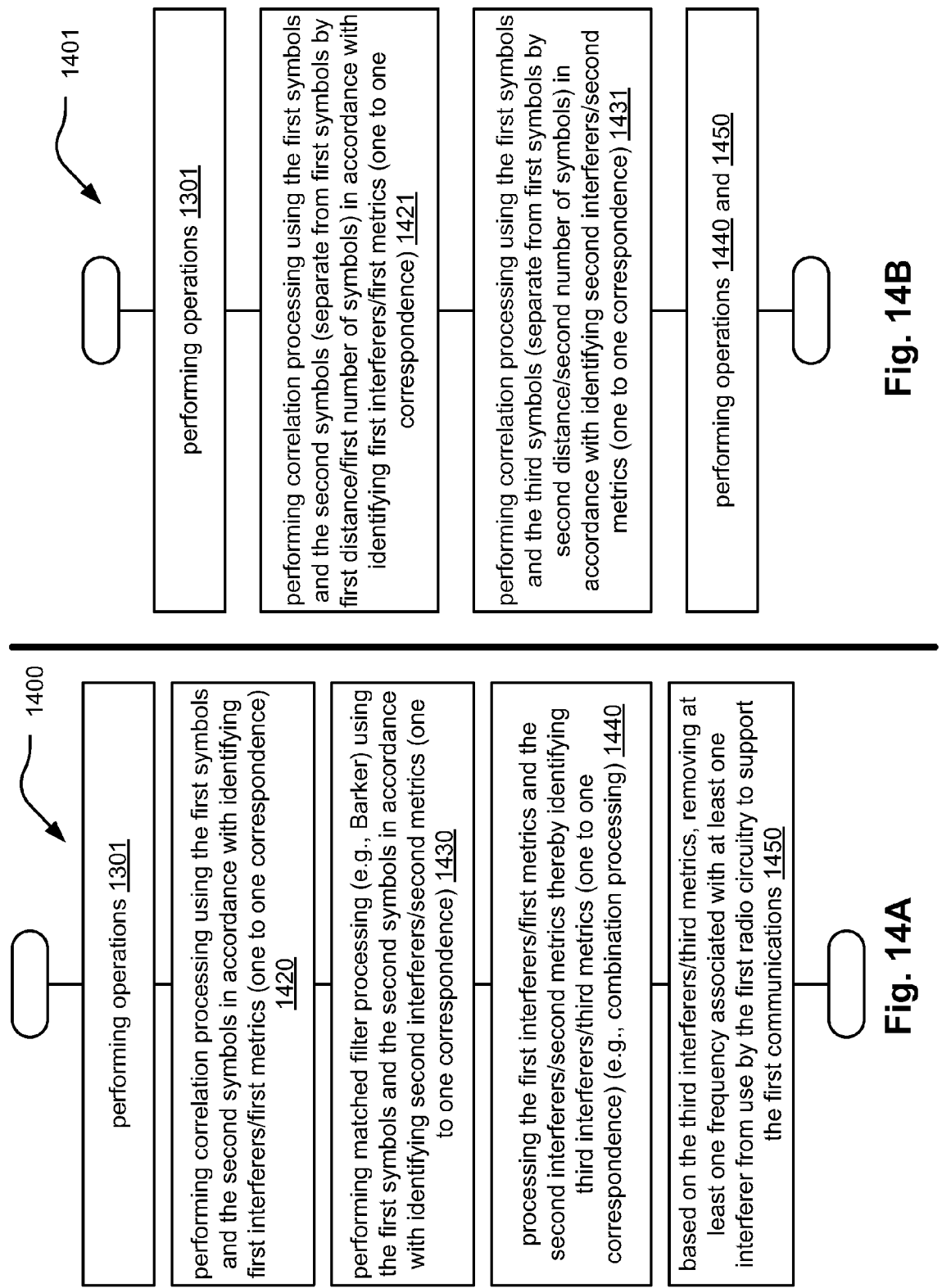

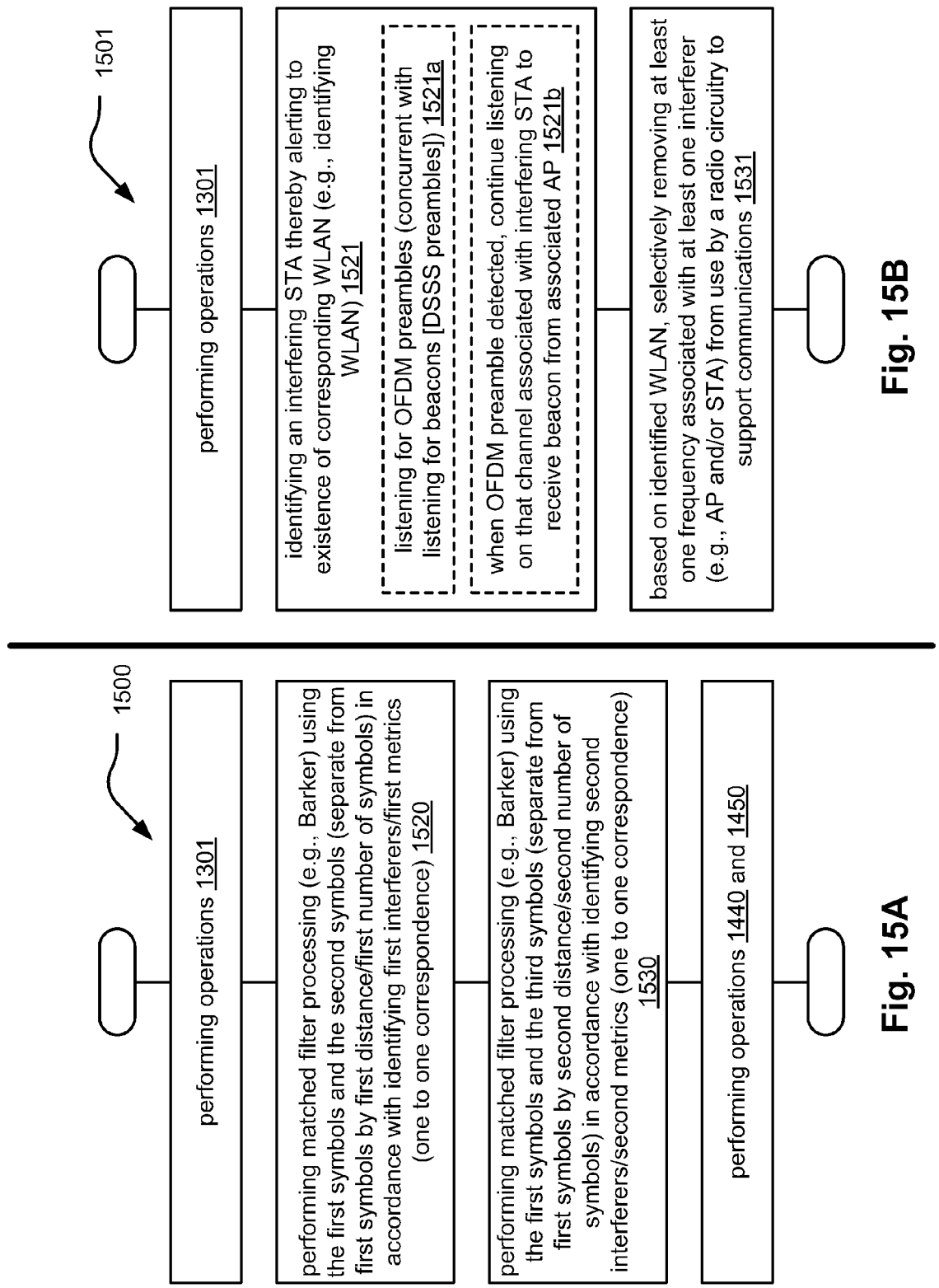

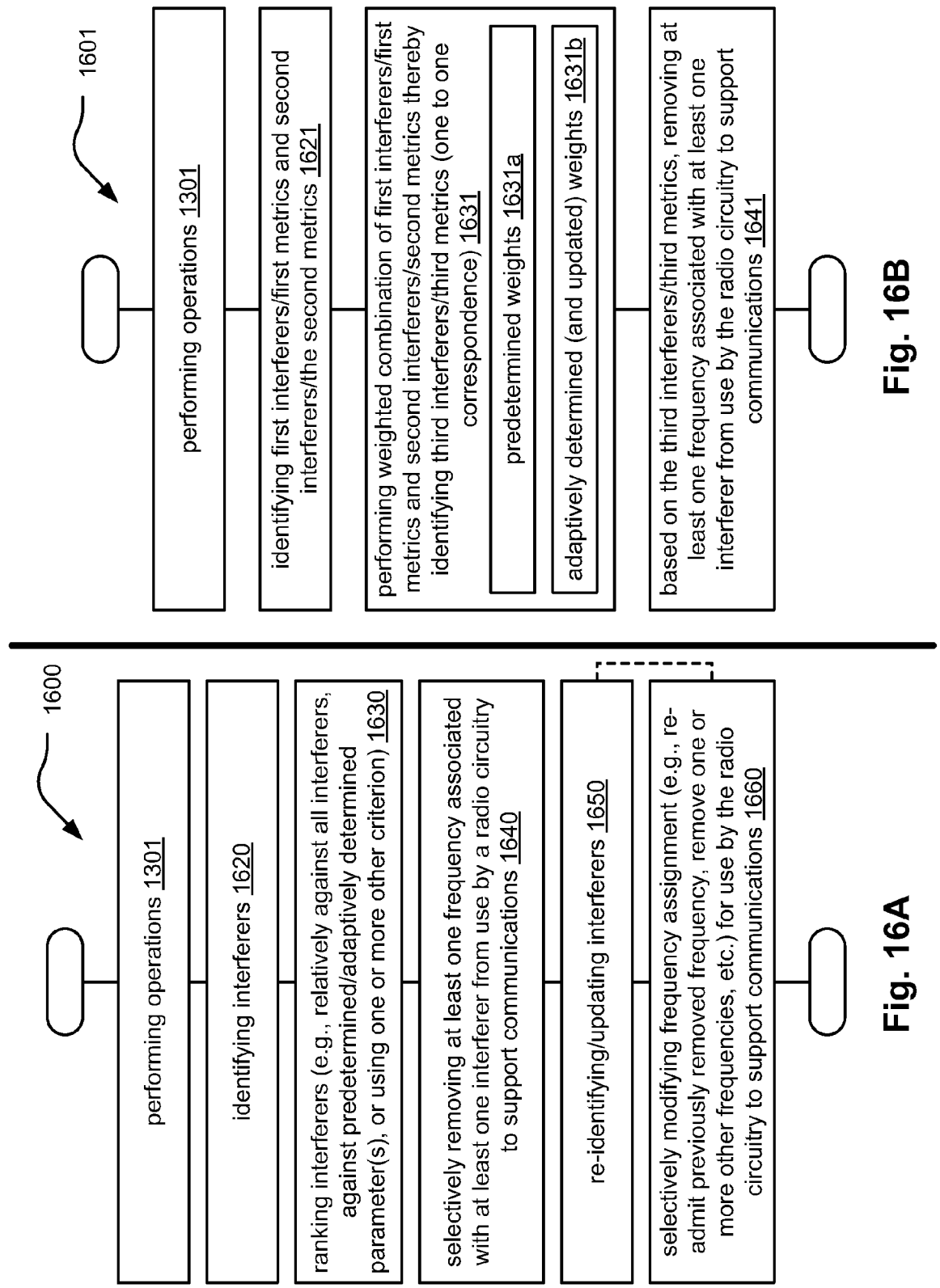
Fig. 16A / Fig. 16B

DIRECT DETECTION OF WIRELESS INTERFERERS IN A COMMUNICATION DEVICE FOR MULTIPLE MODULATION TYPES

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:

1. U.S. Provisional Application Ser. No. 61/181,067, entitled "Hybrid location determination for wireless communication device," filed May 26, 2009, pending.

2. U.S. Provisional Application Ser. No. 61/263,072, entitled "Direct detection of wireless interferers in a communication device for multiple modulation types," filed Nov. 20, 2009, pending.

Incorporation by Reference

The following U.S. Utility patent applications/U.S. patents are hereby incorporated herein by reference in their entirety and made part of the present U.S. Utility patent application for all purposes:

1. U.S. Utility patent application Ser. No. 10/243,857, entitled "Channel estimation in a spread spectrum receiver,", filed Sep. 13, 2002, now U.S. Pat. No. 7,301,993 B2, issued on Nov. 27, 2007.

2. U.S. Utility patent application Ser. No. 11/387,340, entitled "Method and system for antenna and radio front-end topologies for a system-on-a-chip (SOC) device that combines Bluetooth and IEEE 802.11b/g WLAN technologies,", filed Mar. 23, 2006, pending, which claims priority pursuant to 35 U.S.C. §119(e) to the following U.S. Provisional patent application which is hereby incorporated herein by reference in its entirety and made part of the present U.S. Utility patent application for all purposes:
   a. U.S. Provisional Application Ser. No. 60/686,482, entitled "Method and system for antenna and radio front-end topologies for a system-on-a-chip (SOC) device that combines Bluetooth and IEEE 802.11a/b/g WLAN technologies,", filed Jun. 1, 2005, now expired.

3. U.S. Utility patent application Ser. No. 11/751,848, entitled "Shared LNA and PA gain control in a wireless device,", filed May 22, 2007, pending.

4. U.S. Utility patent application Ser. No. 12/484,867, entitled "Hybrid location determination for wireless communication device,", filed Jun. 15, 2009, pending, which claims priority pursuant to 35 U.S.C. §119(e) to the following U.S. Provisional patent application which is hereby incorporated herein by reference in its entirety and made part of the present U.S. Utility patent application for all purposes:
   a. U.S. Provisional Application Ser. No. 61/181,067, entitled "Hybrid location determination for wireless communication device,", filed May 26, 2009, pending.

5. U.S. Utility patent application Ser. No. 12/017,135, entitled "Method and system for rapidly detecting the presence of interferers in Bluetooth frequency hopping,", filed Jan. 21, 2008, pending, which claims priority pursuant to 35 U.S.C. §119(e) to the following U.S. Provisional patent application which is hereby incorporated herein by reference in its entirety and made part of the present U.S. Utility patent application for all purposes:
   a. U.S. Provisional Application Ser. No. 60/950,369, entitled "Method and system for rapidly detecting the presence of interferers in the Bluetooth hopping bandwidth,", filed Jul. 18, 2007, now expired.

BACKGROUND OF THE INVENTION

1. Technical Field of the Invention

The invention relates generally to wireless communication devices; and, more particularly, it relates to identifying and managing frequency spectra, while considering various frequency interferences therein, within such wireless communication devices implemented within a variety of communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it will typically includes a built-in radio (e.g., a transceiver having receiver and transmitter capability for bi-directional communications, or a receiver or transmitter for supporting on uni-directional communications) or is coupled to an associated radio transceiver (e.g., a station for in-home and/or in-building wireless communication networks, RF modem, etc.). As is known, the receiver may also be coupled to an antenna and includes a low noise amplifier (LNA), one or more intermediate frequency stages, a filtering stage, and a data recovery stage. The LNA receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. However, such desires have gone unrealized when it comes to implementing baseband and RF on the same chip for multiple wireless communication standards. In addition, many components and/or modules within the components employed within such communication devices and wireless communication devices include many off-chip elements.

Also, as the prevalence of wireless communication devices continues to grow, there is continually an increase in the possibility of interferences between them. In considering a finite frequency spectra used by multiple communication devices, there is a need in the art for some means by which use of various portions of such frequency spectra may be used by the various communication devices. There does not exist an adequate means in the art to address such problems and deficiencies.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 6 is a diagram illustrating an embodiment of regions in which various wireless communication devices operate and in which interference may occur there between.

FIG. 13, FIG. 14A, FIG. 14B, FIG. 15A, FIG. 15B, FIG. 16A, and FIG. 16B, illustrates various embodiments of methods that may be performed within a wireless communication device to process received communications and to manage the frequency spectra use for such communications.

DETAILED DESCRIPTION OF THE INVENTION

Figure 1:
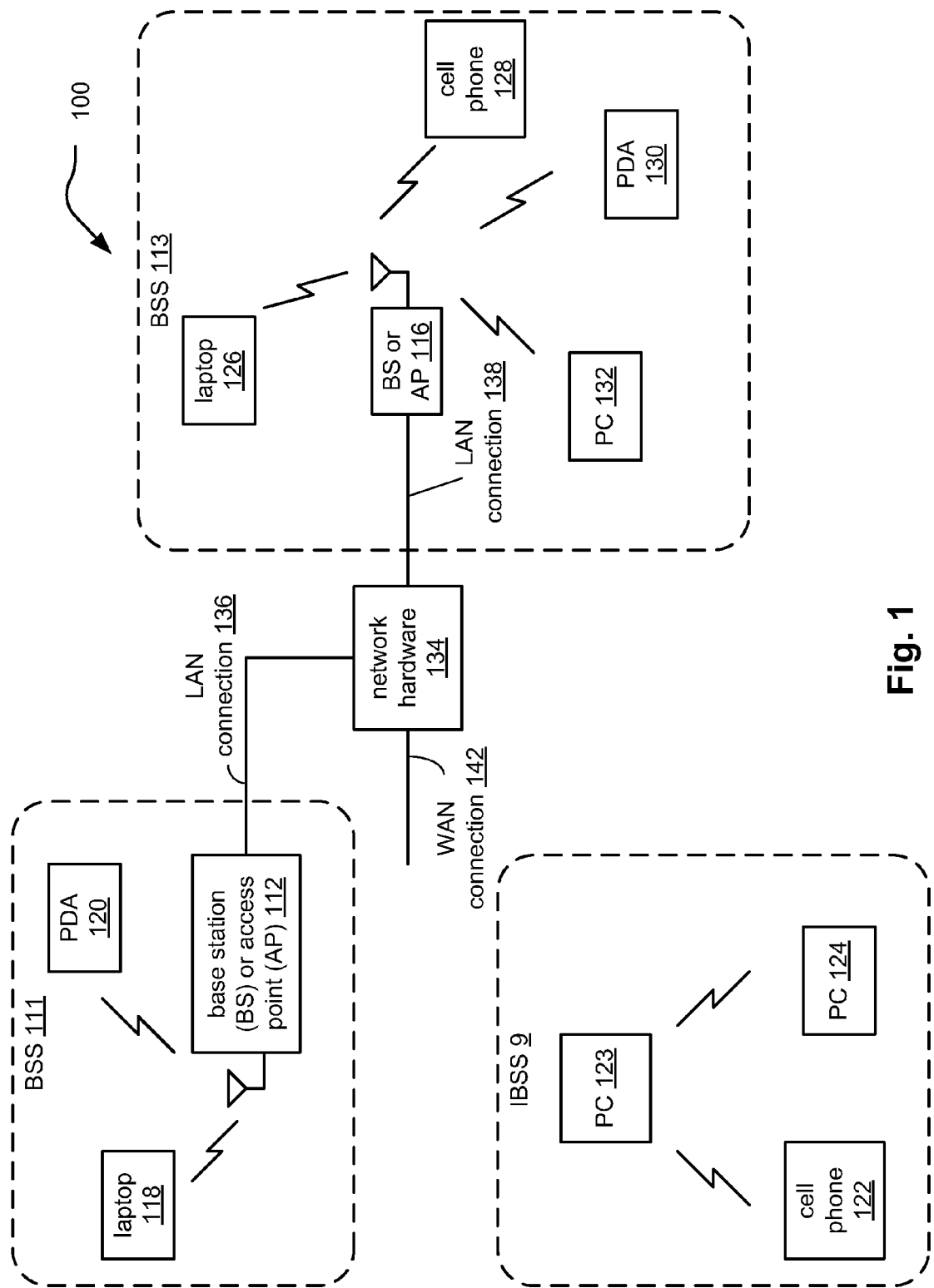
FIG. 1 is a diagram illustrating an embodiment of a wireless communication system.

A novel means is presented herein by which a wireless communication device is operative to tune to any portion of a frequency spectrum to detect communication traffic thereon. For example, considering a communication device that is operative to employ a first portion of a frequency spectrum (or first respective portions of various frequency spectra), yet that same communication device operates within a region in which it may incur undesirable interference from other communication devices that may employ common frequency portions (e.g., such communication devices may generally be referred to as interferers).

Considering a specific example, a Bluetooth type of communication device may operate within a region in which other communication devices (e.g., those operating in accordance with IEEE 802.11 standards and/or recommended practices), such a Bluetooth communication device is operative to tune to all frequency portions (e.g., tune to all eleven (11) IEEE 802.11 channels in the 2.4 GHz industrial, scientific, and medical (ISM) radio band and detect IEEE 802.11b/g traffic therein. It is noted that proximate Bluetooth and IEEE 802.11b/g communication networks can coexist with one another in the same 2.4 GHz ISM band via frequency separation (e.g., Bluetooth's adaptive frequency-hopping spread spectrum (AFH) signaling capability introduced in the Bluetooth specification version 1.2). This may be viewed as being able to tune to all channels that may be used in accordance with IEEE 802.11 communications (or those using any other frequency spectra). Clearly, other portions of the frequency spectrum may also be tuned to and monitored to identify possible interferers.

Moreover, with respect to communication devices that operate in accordance with an IEEE 802.11 wireless local area network (WLAN), there may be differences (sometimes significant) between various communication devices and regarding their respective location and proximity to the communication device that is operative to identify or characterize them as an interferer. For example, a wireless station (STA) may be relatively much closer to a Bluetooth communication device (e.g., that is operative to identify or characterize an interferer) that an access point (AP) (that may be relatively much further away from the Bluetooth communication device). It is also noted that such a communication device may be able not only to identify or characterize such interferers within a communication network in which the communication device operates, and to rank such identifiers, but also to make a mapping (e.g., a spatial or volumetric mapping) of such interferers within the vicinity in which the communication device operates.

In such instances, the Bluetooth communication device is operative not only to identify interferers but also to rank the effect, relatively, that each interferer has on the operation of the Bluetooth communication device. The calculation of a corresponding metric for each respective interferer (e.g., such that each metric corresponds to one respective interferer) allows for the relative ranking of the interferers. It is noted that each detected signal may have an associated metric (including those that do not subsequently get removed from use by at least one of the radio circuitries within a communication device). Generally speaking, any detected signal may be generally referred to as an interferer, yet not all of those detected signals interfere to such a degree as to warrant their removal from use by at least one of the radio circuitries within a communication device.

For example, considering the example of a Bluetooth communication device (e.g., that operates using adaptive frequency-hopping spread spectrum (AFH) signaling) that is operative to identify or characterize such interferers within a WLAN (e.g., STAs and APs), the AFH map (that sets which portions of the frequency spectrum are employed) may be modified. The AFH map may also be updated as a function of time, based on a change in operating conditions of the communication network/region in which the communication device operates, or based on any other criterion.

In some embodiments, only those interferers whose associated metric exceeds a threshold (e.g., which may a predetermined threshold, an adaptively determined threshold based on any number of criteria, etc.) are removed for use by the communication device that is operative to identify or characterize such interferers (and use that information to manage frequency spectrum use for wireless communications). In other embodiments, only the highest ranking (e.g., the first N worst interferers, when N is an integer) interferers are removed for use. Again, this ranking of the interferers may be updated/modified as well (e.g., as a function of time, based on a change in operating conditions of the communication device or a communication channel employed by the communication device that is detected, etc.).

It is again noted that Bluetooth and IEEE 802.11b/g networks can coexist within the same 2.4 GHz ISM band via frequency separation (e.g., Bluetooth's AFH signaling capability introduced in the Bluetooth specification version 1.2). However, it is noted that detecting the strongest WLAN interferers can be challenging. A means presented herein is operative to address and overcome these and other issues. Such WLAN networks can be present on any of the eleven (11) possible channels, and the corresponding APs and STAs on each network may be located in a very large region (e.g., 30 meters or more).

The traffic intensity in such communication networks is driven by usage scenarios (e.g., traffic intensity can be skewed from AP-to-STA, STA-to-AP, or bi-directional, it can be very bursty, the signal levels seen at the Bluetooth communication device may have a very large dynamic range due to the very large local area network (LAN) ranges (versus personal are network (PAN)), and so on). Also, once a Bluetooth communication device has condemned certain frequencies as "bad" and removed them from the AFH map (e.g., identified and removed one or more interfering frequencies), means are presented herein by which a communication device may be operative quickly and reliably to ascertain when those same frequencies/channels may have turned acceptably "good" again (e.g., once again usable, for example due any number of considerations including that the communication device itself may have moved out of range from the interfering WLAN network).

For example, considering one possible situation, given that there can be several WLAN networks operational in an enterprise environment and given that there is a lower limit of 20 hop frequencies that a Bluetooth communication device can use in its AFH map (e.g., such a requirement being driven by FCC Part 15 regulatory requirements), a means is presented herein by which a communication device is operative to perform identification and detection of interferers (e.g., including WLAN interference detection and any respective the STAs and APs therein) capabilities can be accomplished by a communication device (e.g., such as a Bluetooth communication device) by actively tuning to all center frequencies (e.g., WLAN center frequencies) and listening for direct-sequence spread spectrum (DSSS) and orthogonal frequency division multiplexing (OFDM) preambles simultaneously and recording the strongest received signal strength indication (RSSI) levels at each center frequency (e.g., each WLAN center frequency). In order to save power, such a communication device (e.g., a Bluetooth communication device) may also perform targeted measurements of interferer (e.g., WLAN interferer) activity levels and signal levels after being triggered to do so from the results of a low power spectrum (LPS) scan. [e.g., as described in the various patent applications incorporated by reference herein above and being entitled, "Method and system for rapidly detecting the presence of interferers in Bluetooth frequency hopping" and/or "Method and system for rapidly detecting the presence of interferers in the Bluetooth hopping bandwidth"].

Therefore, this approach may provide for reduced power consumption within the communication device as well as high reliability using such a 2-step technique (e.g., LPS scan followed by active 802.11b/g preamble detection). In accordance with performing an LPS scan, a communication device (e.g., a receiver) performs a fast energy detection process in accordance with sweeping across an entire frequency range (e.g., across an 80 MHz to 2.4 GHz frequency band in some instances). In the instance when a WLAN operates within a vicinity of a communication device performing such an LPS scan, such a fast energy detection process in accordance with sweeping across a frequency range would reveal energy across a particular range (e.g., approximately 20 MHz) and that being centered around one of the WLAN frequencies. In accordance with various operational aspects presented herein, a communication device (e.g., a receiver) then could tune in to that particular center frequency (e.g., of the WLAN interferer) and then perform listening for DSSS/OFDM preambles, beacons, etc. This LPS scan approach also consumes relatively little power, in that, within a firmware related application, some or a majority of the firmware need not be running at that particular time (e.g., being in a lowered power state and/or being clocked at a reduced clock frequency than usual). In an event where some criterion has been met (e.g., a threshold has been passed within the LPS scan), certain modules (e.g., a CPU itself, certain firmware, certain logic circuitries, etc.) may be brought out of a lower power state to perform additional processing such as thorough verification processing, etc. In certain embodiments, this may include operating such modules (e.g., the firmware) to begin listening for DSSS/OFDM preambles, beacons, etc.

As mentioned above, it is noted that many wireless communication devices may operate in close proximity with other wireless communication device (often employing similar or relatively close frequency bands). The means presented herein provides a very accurate approach to identify and rank potential interferers. In addition, with respect to a Bluetooth communication device operating in proximity of a WLAN, it is noted that a Bluetooth communication device employing the novel approach presented herein allows for the detection of WLAN presence with much improved reliability by directly detecting DSSS and OFDM preambles and recording the associated RSSI levels. This novel, direct determination of both IEEE 802.11b and IEEE 802.11g interference levels may be performed using a common circuitry and/or module within a communication device by employing correlation processing (e.g., auto-correlation), which is time-domain based, for both DSSS and the preamble-based OFDM packet detection.

In other words, a common circuitry and/or module within a communication device that is employed for DSSS preamble detection may be employed for interferer identification and management. It is noted that such a common circuitry and/or module within a communication device may also be employed for location based services (LBSs) [e.g., as described in the various patent applications claimed priority to and incorporated by reference herein above and being entitled, "Hybrid location determination for wireless communication device"].

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, etc., provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access point 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
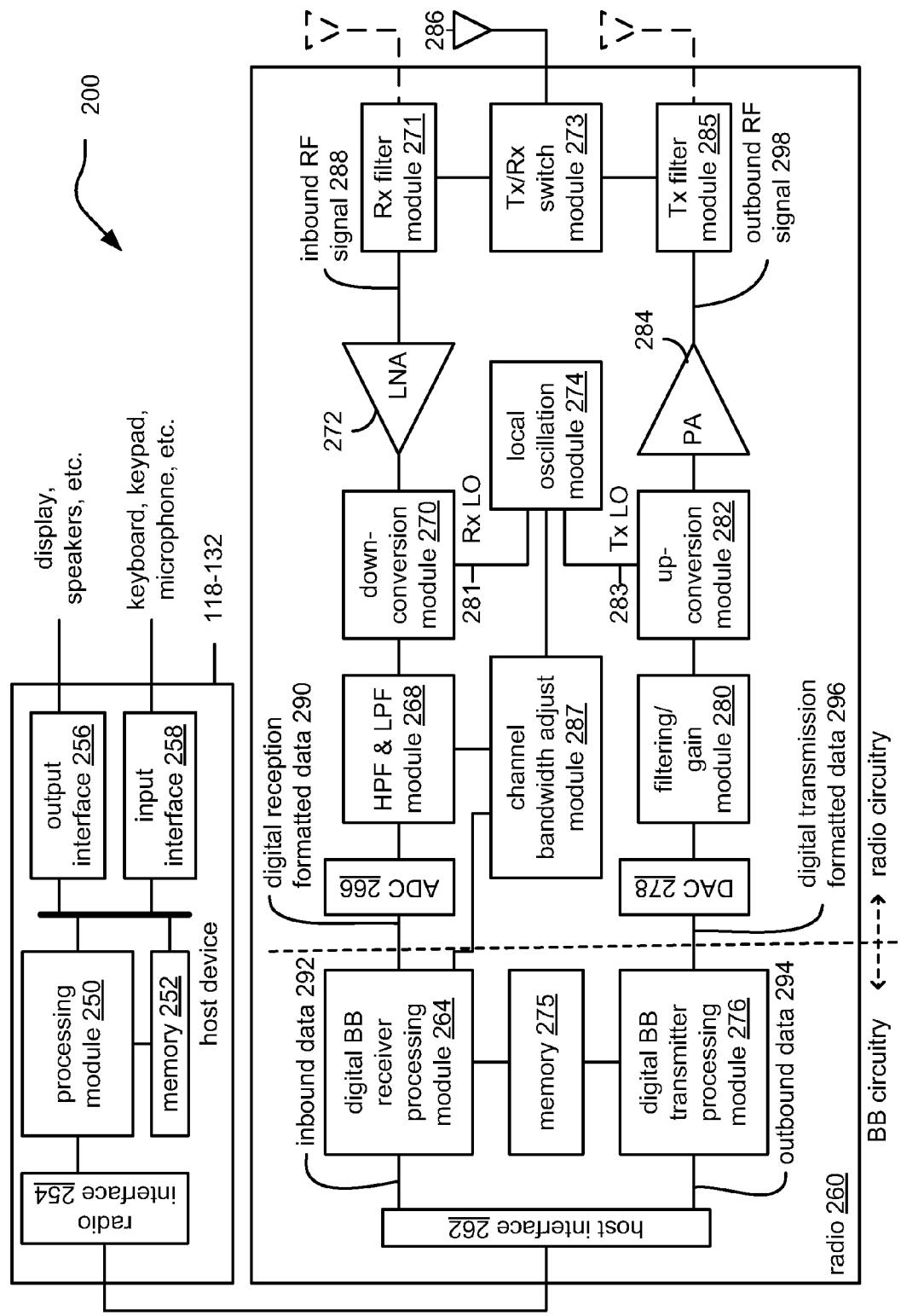
FIG. 2 is a diagram illustrating an embodiment of a wireless communication device.

FIG. 2 is a diagram illustrating an embodiment 100 of a wireless communication device that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, etc., such that the received data may be displayed. The radio interface 254 also provides data from the processing module 250 to the radio 260. The processing module 250 may receive the outbound data from an input device such as a keyboard, keypad, microphone, etc., via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274, memory 275, a digital transmitter processing module 276, a digital-to-analog converter 278, a filtering/gain module 280, an IF mixing up conversion stage 282, a power amplifier 284, a transmitter filter module 285, a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device is compliant.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation de-mapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, ZigBee, WiMAX (Worldwide Interoperability for Microwave Access), any other type of radio frequency based network protocol and/or variations thereof etc.) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As one of average skill in the art will appreciate, the wireless communication device of the embodiment 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a wireless local area network (WLAN/WiFi) (e.g., one of the IEEE (Institute of Electrical and Electronics Engineer) 802.11 protocols such as 802.11a, 802.11b, and/or 802.11g), a Bluetooth protocol, or any other predetermined means by which wireless communication may be effectuated.

Figure 3:
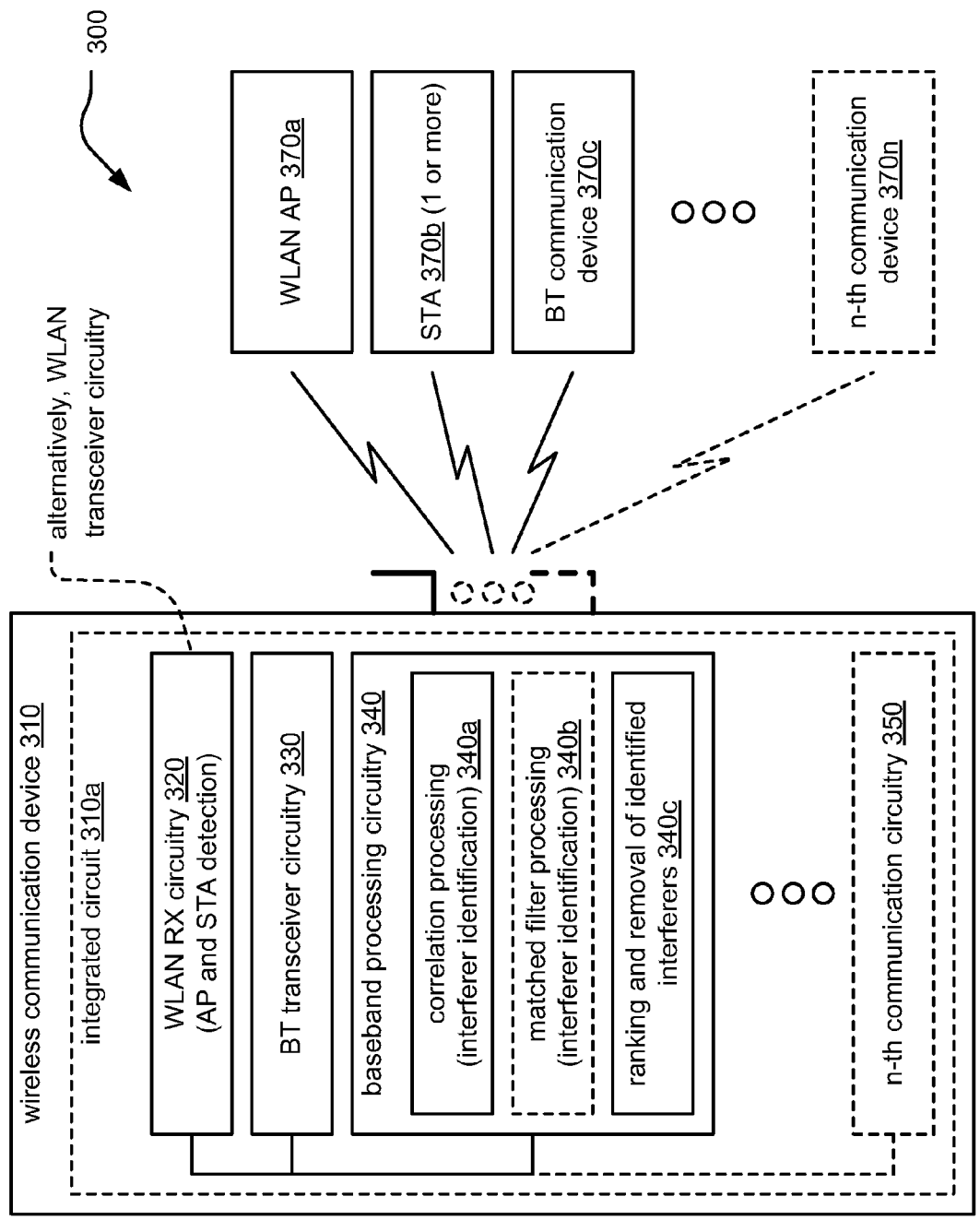
FIG. 3 is a diagram illustrating an alternative embodiment of a wireless communication device.

FIG. 3 is a diagram illustrating an alternative embodiment 300 of a wireless communication device 310. The wireless communication device 310 includes a wireless local area network (WLAN) receiver (RX) circuitry 320 that is operative to perform detection of WLAN communication network activity including the detection of any respective STAs and APs within such a WLAN. The wireless communication device 310 also includes a Bluetooth (BT) transceiver circuitry 340, and in some embodiments, may include up to an n-th communication circuitry 350 to communicate with any of a variety of wireless communication networks.

The wireless communication device 310 also includes a baseband processing circuitry 340 that is coupled to each of the WLAN RX circuitry 320 and the BT transceiver circuitry 340 (and any other communication circuitries that may be included within the wireless communication device 310). The baseband processing circuitry 340 is operative to process the communications comporting with respective communication protocols received via the WLAN RX circuitry 320 and the BT transceiver circuitry 340 (and any other communication circuitries that may be included within the wireless communication device 310). The baseband processing circuitry 340 is operative to process these received communications to extract symbols there from. For example, this may involve extracting first symbols and second symbols from a received signal.

The baseband processing circuitry 340 is operative to perform correlation processing 340a using the first symbols and the second symbols in accordance with identifying interferers and associated metrics. In some embodiments, the baseband processing circuitry 340 includes a matched filter processing module (block 340b) that is operative to process the first symbols and the second symbols in accordance with the identifying the interferers and the metrics.

It is noted that each metric corresponds to one interferer (e.g., this may be viewed as a one to one relationship). Based on the metrics associated with each of the interferers, the baseband processing circuitry 340 is operative to rank the interferers (block 340c). Then, based on the rank of any interferers, the baseband processing circuitry 340 is operative to remove at least one frequency associated with at least one of the interferers from use by one or more of the communication circuitries implemented within the wireless communication device 310 (block 340c).

One or more of the components within the wireless communication device 310 may be implemented within a single integrated circuit 310a, or they may alternatively be implemented in two or more integrated circuits, and/or one or more printed circuit boards. The wireless communication device 310 is operative to communicate with a WLAN access point (AP) 370a and/or one or more STAs 370b using the WLAN RX circuitry 320.

Also, the wireless communication device 310 is operative to communicate with a BT communication device 370c using the BT transceiver circuitry 340. Also, in embodiments where the wireless communication device 310 includes an n-th communication circuitry 350, the wireless communication device 310 may also be operative to communicate with an n-th communication device 370n (e.g., that operates in accordance with an n-th communication protocol).

It is noted that, in some embodiments, the WLAN RX circuitry 320 is a reduced or minimum functionality receiver circuitry that need not include any transmitter (TX) capability at all. In some embodiments, this reduced/minimum functionality RX is operative to perform WLAN beacon processing. This minimal amount of processing of only a portion of the communications provided from the WLAN AP 370a includes extracting the media access control (MAC) address and/or the received signal strength indication (RSSI) measures associated with such communications.

Figure 4:
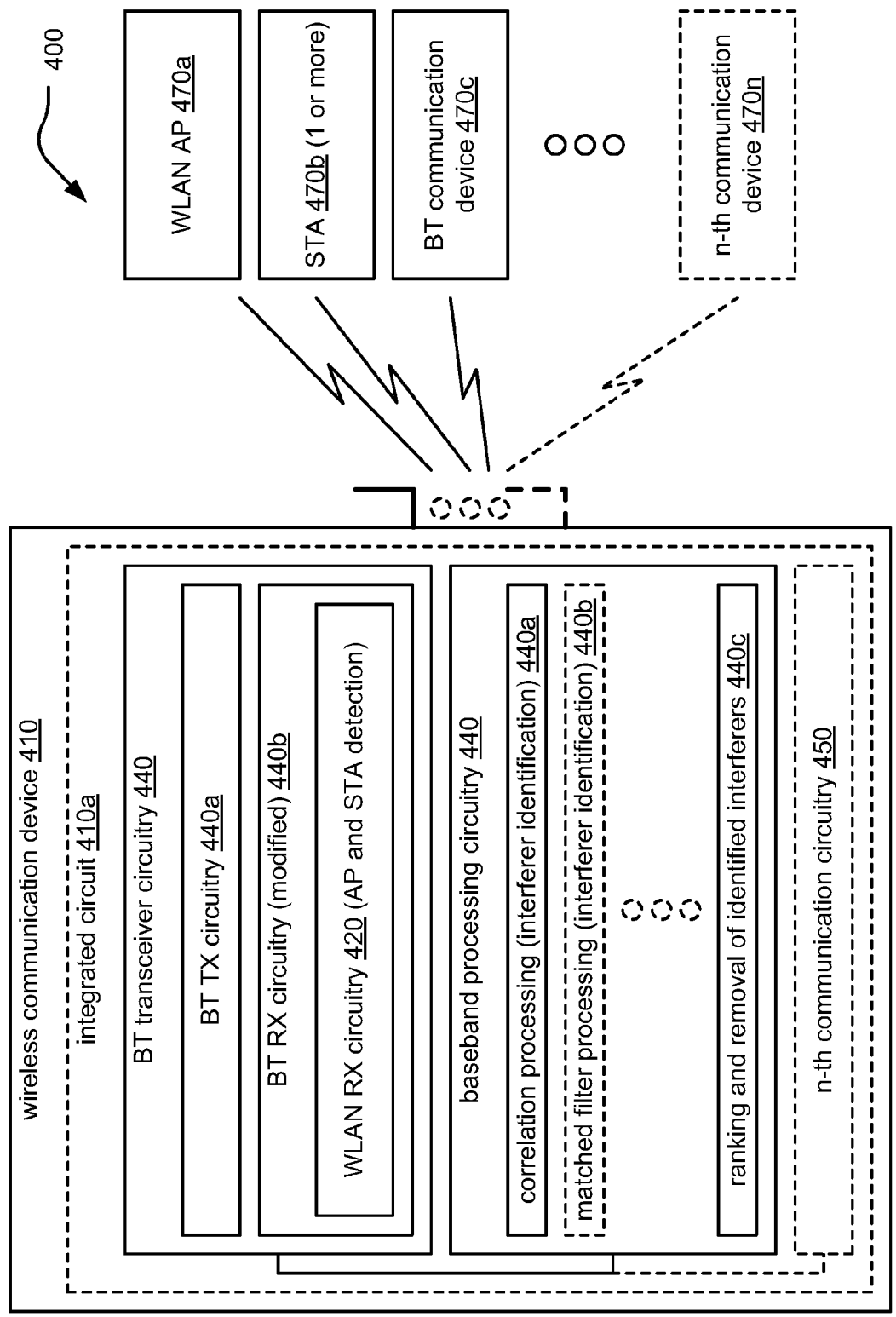
FIG. 4 is a diagram illustrating an alternative embodiment of a wireless communication device.

FIG. 4 is a diagram illustrating an alternative embodiment 400 of a wireless communication device. This embodiment 400 has some similarities to the previous embodiment 300. For example, wireless communication device 410 may be implemented using a single integrated circuit 410a, one or more integrated circuits, printed circuit boards, etc. In embodiments where the wireless communication device 410 includes an n-th communication circuitry 450, the wireless communication device 410 may also be operative to communicate with an n-th communication device 470n (e.g., that operates in accordance with an n-th communication protocol). Each of these radio circuitries is coupled to a baseband processing circuitry 440 that is operative to perform various digital signal processing functions as well.

However, at least one difference being that the wireless communication device 410 is that a BT transceiver circuitry 440 includes a BT TX circuitry 440a and a BT RX circuitry 440b (that is modified with respect to a conventional or typical BT RX circuitry to allow processing of beacons provided by WLAN AP 470a). The BT RX circuitry 440b includes WLAN RX circuitry 420 that is operative to perform detection of WLAN communication network activity including the detection of any respective STAs and APs within such a WLAN. In some embodiments, the baseband processing circuitry 340 includes a matched filter processing module (block 440b) that is operative to process the first symbols and the second symbols in accordance with the identifying the interferers and the metrics.

There is significant re-use or sharing of processing resources, circuitry, etc. within the BT RX circuitry 440b to perform also the processing of beacons provided by the WLAN AP 470a to process only a portion of the communications provided from the WLAN AP 470a includes extracting the MAC address and/or the RSSI measures associated with such communications. In other words, there is very little modification of the BT RX circuitry 440b to enable the ability to perform processing of communications provided from the WLAN AP 470a. For example, the one or more antennae of the wireless communication device 410, the low noise amplifier (LNA) stages and automatic gain control (AGC) stages, one or more mixers, etc. of the BT RX circuitry 440b are employed commonly for processing both BT communications as well as for WLAN communications. Even the filter structure within the BT RX circuitry 440b is same for both BT communications as well as for WLAN communications (with only difference being the values of the coefficients used for each). One additional functional block or circuitry employed to process the beacons provided in accordance with WLAN communications is a SYNC functional block or circuitry, which operates to remove Barker spreading and to identify the strongest signal path, based on which frame timing is determined.

WLAN APs, operating in accordance with IEEE 802.11, typically operate at a particular frequency (e.g., 2.4 GHz for IEEE 802.11b, 5 GHz for IEEE 802.11a, etc.) and transmit beacons at the 1 Mbps rate, using differential binary phase shift keying (DBPSK) modulation with direct-sequence spread spectrum (DSSS) spreading at approximately 1 beacon every 100 ms. The MAC address can be obtained from the MAC header as well as the service set identifier (SSID) information, which is embedded in the frame body field of the IEEE 802.11 management frame, if SSID is useful. In general, all demodulated WLAN bits from the beacon could simply be dumped to memory, in order for Firmware to post-process this information in order to obtain the MAC address and other relevant information. RSSI may also be measured on the beacons frames; for array antenna based platforms, the measurement accuracy would be improved even in disperse channels. In accordance with certain WLAN/WiFi service providers, some of them maintain databases of WiFi APs along with their location coordinates, that will be associated with the MAC addresses extracted from communications from such WLAN APs.

As referred to above, only a reduced or minimum amount of IEEE 802.11 receiver functionality is employed or needed to accommodate the processing of beacons provided from such a WLAN AP.

With respect to the radio circuitry within such a wireless communication device, the radio receiver path need only be modified in a very minor way to accommodate the 20 MHz wide WLAN signal bandwidth, which is currently narrower to remove ambient country identifier (ACI) and blockers for Bluetooth. The first AADF stages of the radio receiver path have wider than 20 MHz bandwidths and the DS oversampling is high enough to obtain adequate dynamic range.

With respect to the baseband processing circuitry within such a wireless communication device, the automatic gain control (AGC) circuitry, the IEEE 802.11 frame detection, 11 MHz (single-sided bandwidth) channel select filtering, initial time and frequency correction, followed by channel estimation and demodulation of bits is the normal sequence of flow for some IEEE 802.11b receivers.

To simplify the baseband processing and/or to reduce complexity in certain embodiments, RAKE matched filtering may be optionally excluded. Of course, in other embodiments, RAKE matched filtering may be employed. From the output of the Barker Matched Filter (BMF) based SYNC block, the strongest path may simply be chosen (i.e., instead of doing any combining processing therein). For more disperse channels, the signal to noise ratio (SNR) penalty will increase by taking this short-cut, but in typical cases there may be a minor loss of performance (e.g., 2 to 3 dB in some embodiments).

This minor performance loss may be compensated by the fact that in order to minimize the hidden-node problem, AP's (usually connected to wall-power outlets providing 120 V AC at approximately 60 Hz) transmit at higher (and at fixed) transmit levels, than wireless stations (STAs).

Thus, a simplified baseband hardware module or circuitry of such a wireless communication device may simply comprise of a BMF (simple, 22-tap FIR filter running at 22 MHz). Also, the SYNC block simply picks the strongest path component. Early-late time tracking is performed on samples out of the BMF. Bluetooth's Early-Late hardware can be reused for time tracking purposes. Basically, the BMF gives synchronization to within 1 chip and then time tracking is done to reduce the synchronization error further. Carrier frequency offset (CFO), due to differences in the transmitter and receiver local oscillators (Los), results in a constant phase error at the output of the demodulator and can also be removed by reusing BT circuitry. Also, the start of frame delimiter (SFD) is also used from the frame sync.

A BT demodulator may be modified (with only a slight modification required) to perform DBPSK demodulation of the beacons provided by a WLAN AP. The IEEE 802.11 receive digital processing is based on operation of I/Q samples at 22 Ms/s, so a sample rate conversion to 22 Ms/s would need to be performed. The rate adaptor hardware in the current BT design is able to provide this.

Also, the very same configurable channel select filter as used in current BT design may be employed for processing the beacons provided by the WLAN AP. However it is noted that this will need to be clocked at a higher frequency to accommodate the 20 MHz signal.

As can be seen, the vast majority of components within the BT receiver may be also used to perform the processing of received beacons from the WLAN AP. The BT receiver architecture lends itself well to a significant level of sharing for use in BT communications. For example, sharing for the processing of both BT and WLAN communications may be made with respect to the one or more antennae, LNA stages and the AGC logic, mixer(s), etc. and even filter structures can remain the same (with the only changes being to the filter coefficient values), in order to support either the narrow band Bluetooth signals or wide band WLAN signals. The main digital block needed is the SYNC block to remove the Barker spreading and identify the strongest signal path, based on which frame timing is determined.

Also, it is noted that there may be only a need to store demodulated bits from the beacons themselves (e.g., and no need to store any other bits/communications from a WLAN AP or STA transmissions). Therefore, hardware-assist may also be provided to ascertain that the frame is in fact a beacon, before dumping such bits to memory. IEEE 802.11 frames consist of a MAC header, followed by a variable length frame body and then a 32-bit cyclic redundancy check (CRC). Beacons can be identified by the all 1 s destination MAC address, which is used for broadcast. If the MAC address indicates a beacon, then the remainder of the frame should continue being demodulated. Alternatively, if the MAC address does not indicate a beacon, then the remainder of the frame could be dumped/discarded.

The hardware-assist is employed to extract the frame duration information from the MAC header, in order to know how long to continue the demodulation processing. However, the CRC checking (FCS) can be performed in firmware, if desired in some embodiments.

Moreover, there is no need to support carrier sense multiple access/collision avoidance (CSMA/CA) protocol, since such wireless communication device operates as a passive, listen-only sniffer that does not ever transmit.

Figure 5:
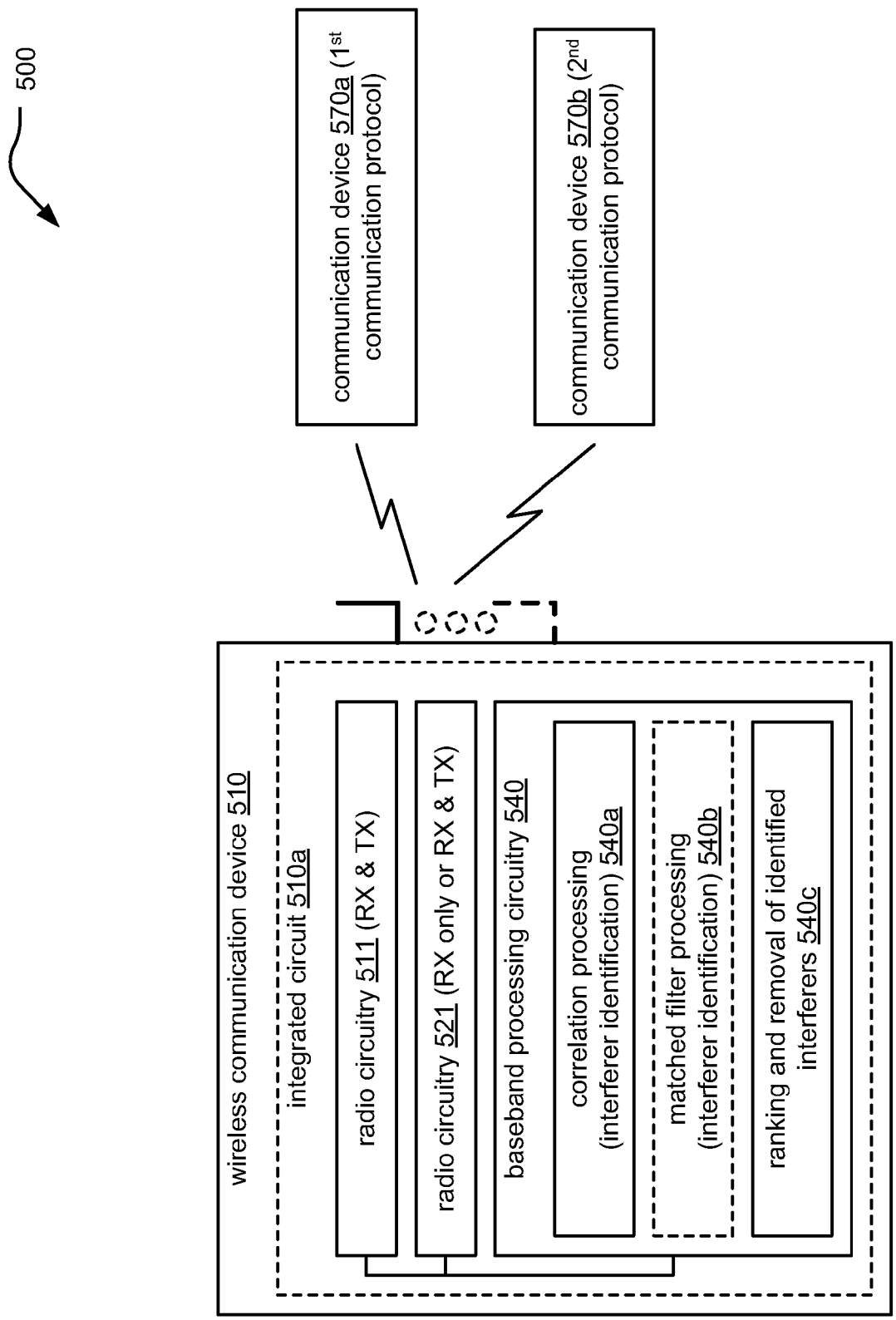
FIG. 5 is a diagram illustrating an alternative embodiment of a wireless communication device.

FIG. 5 is a diagram illustrating an alternative embodiment 500 of a wireless communication device. The wireless communication device 510 includes a first radio circuitry 511 and a second radio circuitry 521. The first radio circuitry 511 is operative to support first communications comporting with a first communication protocol (e.g., with communication device 570a). The second radio circuitry 521 is operative to support second communications comporting with a second communication protocol (e.g., with communication device 570b).

The wireless communication device 510 also includes a baseband processing circuitry that is coupled to the first radio circuitry and the second radio circuitry. The baseband processing circuitry 540 is operative to process communications from either the communication device 570a and/or the communication device 570b. In some embodiments, the baseband processing circuitry 540 is operative to process the second communications comporting with the second communication protocol thereby extracting first symbols and second symbols there from. The baseband processing circuitry 540 is operative to perform correlation processing (block 540a) using the first symbols and the second symbols in accordance with identifying whether or not there are any interferers. Each of these interferers has a corresponding metrics associated therewith (e.g., each metric corresponds to one of the interferers). In some embodiments, the baseband processing circuitry 510 includes a matched filter processing module (block 540b) that is operative to process the first symbols and the second symbols in accordance with the identifying the interferers and the metrics.

It is noted that each detected signal may have an associated metric (including those that do not subsequently get removed from use by at least one of the radio circuitries within a communication device). Generally speaking, any detected signal may be generally referred to as an interferer, yet not all of those detected signals interfere to such a degree as to warrant their removal from use by at least one of the radio circuitries within a communication device.

Based on the metrics associated with each interferer, the baseband processing circuitry 540 is operative to rank the interferer (block 540c). Then, based on the rank of the plurality of interferers, the baseband processing circuitry 540 is operative to remove at least one frequency associated with at least one of the interferers from use by one of the radio circuitries implemented within the wireless communication device 510. In some embodiments, the baseband processing circuitry 540 is operative to remove at least one frequency associated with at least one of the interferers from use by the first radio circuitry to support the first communications (block 540c).

In some embodiments, the baseband processing circuitry 540 includes a correlation processing module and a matched filter processing module therein. For example, such a correlation processing module is operative to perform the correlation processing, and such a matched filter processing module is also operative to process the first symbols and the second symbols in accordance with the identifying the interferers and the metrics.

It is also noted that the various symbols (e.g., first symbols and second symbols) that are processed by the baseband processing circuitry 540 may be separate by a particular distance (e.g., a number of symbols apart from one another). In some embodiments, these first symbols and second symbols are adjacent to one another (e.g., the first symbols are next to or followed by the second symbols). Various embodiments are provided below as well that show alternatives by which the first symbols and second symbols may be chosen from a symbol sequence for processing in accordance with the means presented herein.

In some instances, the baseband processing circuitry 540 is also operative to process third communications, supported using either one of the first radio circuitry 511 or the second circuitry 521, thereby extracting third symbols and fourth symbols there from. Within these third communications, the third symbols may be located a predetermined number of symbols away from the fourth symbols. Also, in other instances, within the second communications, the second symbols are located a first predetermined number of symbols away from the first symbols, and the third symbols are located a second predetermined number of symbols away from the fourth symbols.

Figure 6:
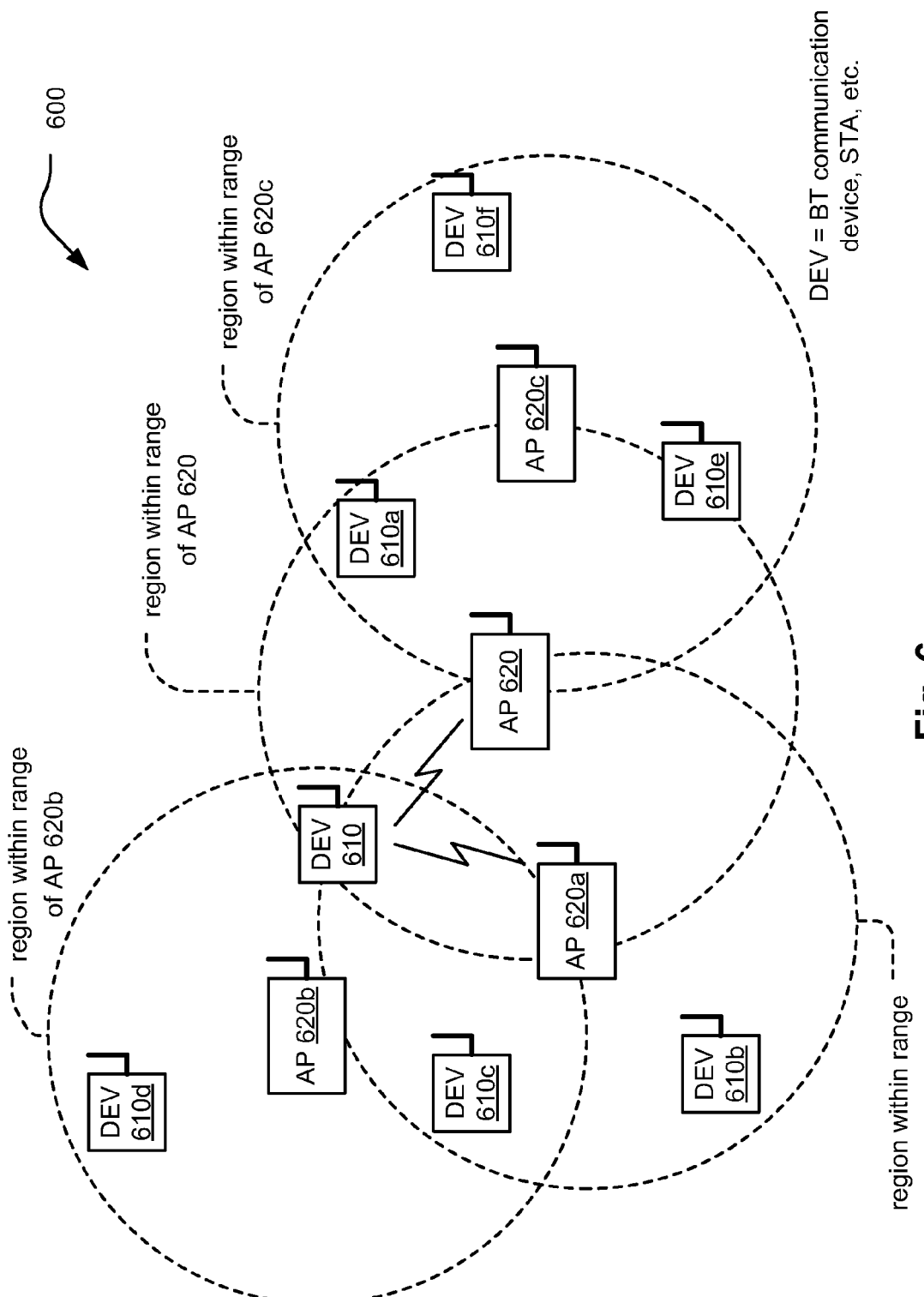

FIG. 6 is a diagram illustrating an embodiment 600 of regions in which various wireless communication devices operate and in which interference may occur there between. Various types of communication devices (generally depicted as DEV) may operate within various regions. For example, a Bluetooth communication device may operate within a region in which a WLAN communication device (e.g., including one or more STAs and/or one or more AP).

This diagram generally depicts how various APs (AP 620, 620a, 620b, and 620c) each has a respective region in which various communication devices may operate and communicate therewith. For example, each of DEVs 610, 610a, and 610e are within the vicinity of and able to communicate with the AP 620. Each of DEVs 610a, 610e, and 610f are within the vicinity of and able to communicate with the AP 620c. Each of DEVs 610, 610c, and 610d are within the vicinity of and able to communicate with the AP 620b. Each of DEVs 610, 610b, and 610c are within the vicinity of and able to communicate with the AP 620a.

As can be seen, many of the communication devices are within range of more than one AP and can communicate with more than one AP. However, a first communication device may be more susceptible to interference caused by a second communication device that is relatively closer than a third communication device that is relatively further away.

Figure 7:
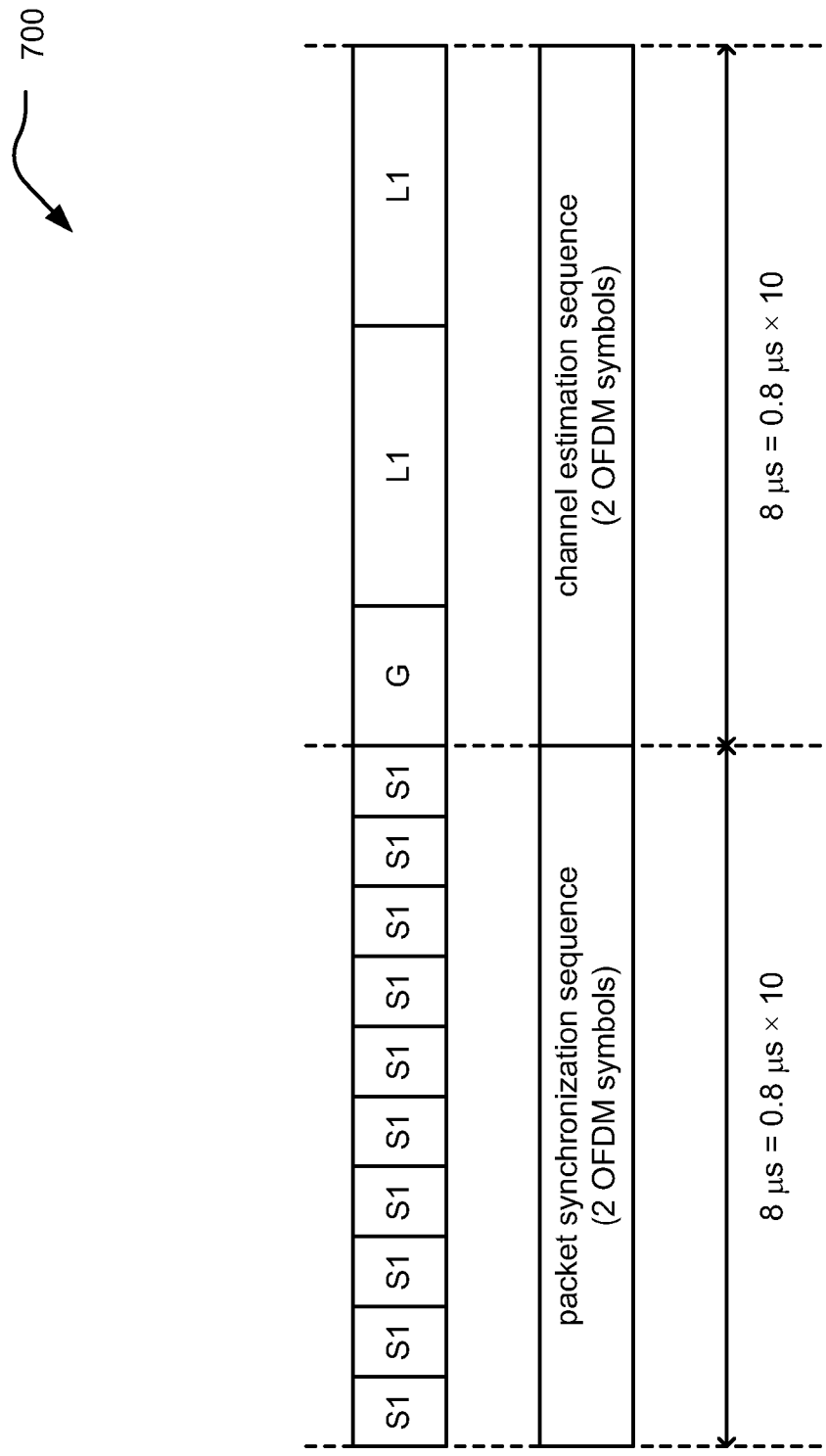
FIG. 7 is a diagram illustrating an embodiment of a preamble portion of an IEEE 802.11g preamble.

FIG. 7 is a diagram illustrating an embodiment 700 of a preamble portion of an IEEE 802.11g preamble. With respect to performing symbol detection and extraction from a received signal, a novel means is presented herein by which both DSSS and OFDM preambles may be simultaneously extracted and the strongest RSSI levels would be recorded at each respective center frequency (e.g., each WLAN center frequency).

IEEE 802.11b DSSS Packet Detection

This process is described above and also within the various patent applications claimed priority to and incorporated by reference herein above and being entitled, "Hybrid location determination for wireless communication device". This DSSS packet detection is performed in accordance with decoding beacon contents. A common, same delay-line and auto-correlation based technique may be employed for both packet detection of DSSS as well as OFDM. Below, it is noted that OFDM preamble detection and coarse frequency estimation can be accomplished by reusing the same hardware used for DSSS.

IEEE 802.11g OFDM Packet Detection

Within an OFDM preamble, the first part of the IEEE 802.11g preamble is comprised of 10 repetitions of a training symbol (shown as S1) each having a duration of 0.8 ms each. This portion of the preamble is used by the receiver for purposes of AGC, packet presence detection (PD), boundary detection (coarse timing) and coarse frequency offset (CFO) estimation (e.g., generally referred to as packet synchronization).

With respect to performing packet detection, a Matched Filter (MF) or a Self-Correlation (CORR) approach may be performed (or some alternative means of combining both, including a weighted combination of both approaches) for an IEEE 802.11g packet detection.

In one embodiment, a preferred embodiment includes performing the self-correlation approach. A communication device (e.g., a WLAN communication device) may be implemented to include weighted packet detection functionality of both the CORR and MF approaches.

In some instances, the CORR technique may handle multipath effects better than the MF technique, but may potentially have a higher rate of false alarms from Bluetooth interferers. Also, assuming there is a single Bluetooth piconet, the BT communication device (e.g., a BT master) would only be performing the preamble detection when there is no BT activity present. In such an instance, it may be preferable firstly to use the CORR approach for packet detect (since BT is a major contributor to false alarms when using the CORR method). Noting that the OFDM preamble has a 0.8 μs periodicity as illustrated and described above and the DSSS preamble has a 1.0 μs periodicity, packet detection can be achieved by using correlation processing (e.g., auto-correlation, referred to above as the CORR approach).

Again, a common circuitry and/or module within a communication device that is employed for DSSS preamble detection may be employed for interferer identification and management. This common circuitry and/or module may be employed for both DSSS or OFDM preambles. Such packet detection for DSSS and OFDM preambles may also be done by reusing the same delay-line based hardware (circuitry and/or modules). It is noted that such a common circuitry and/or module within a communication device may also be employed for location based services (LBSs) [e.g., as described in the various patent applications claimed priority to and incorporated by reference herein above and being entitled, "Hybrid location determination for wireless communication device"].

Figure 8:
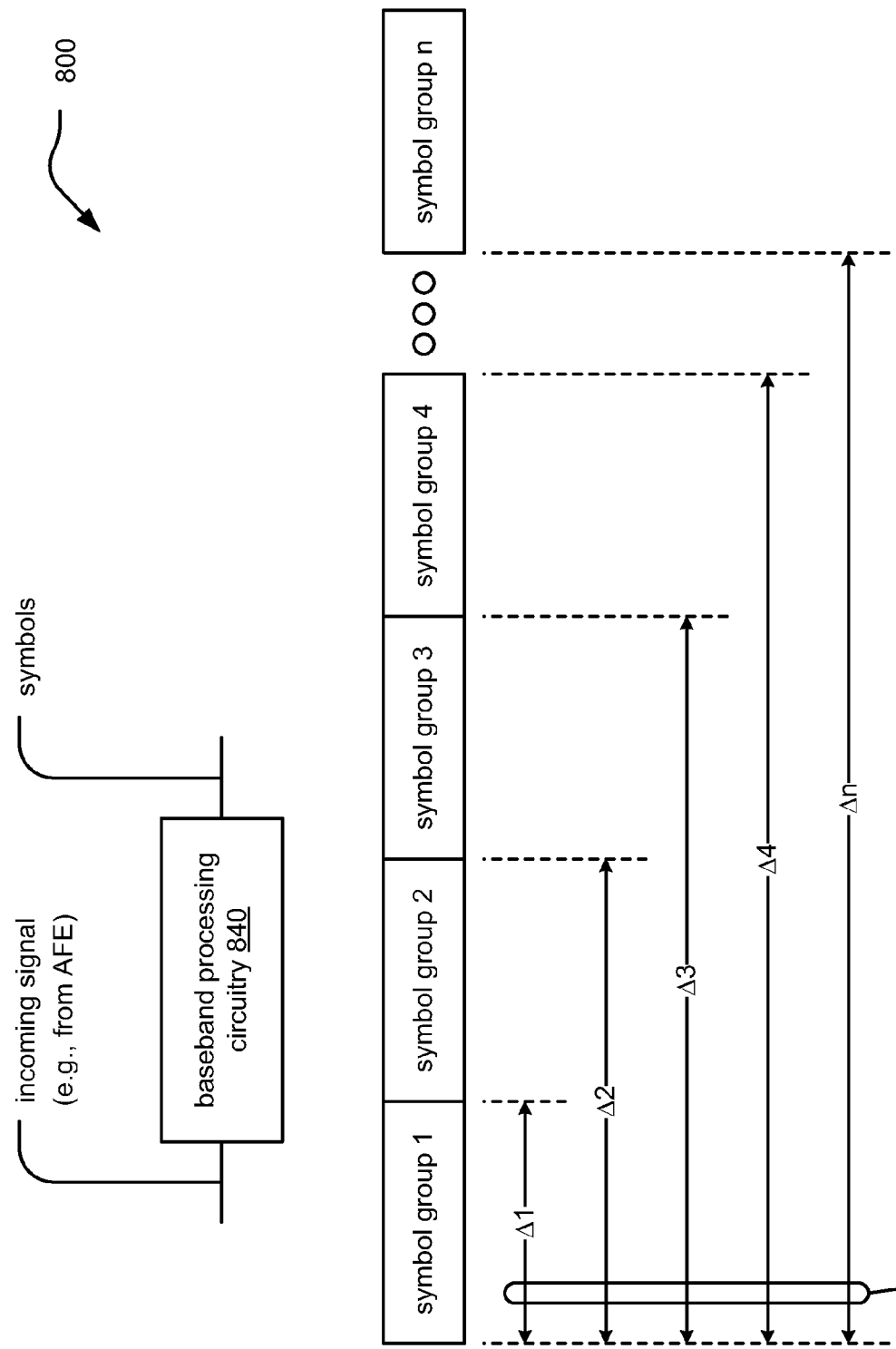
FIG. 8 is a diagram illustrating an embodiment of separation of various symbols groups that may be employed in accordance with correlation processing and/or matched filter processing to manage frequency spectra use for wireless communications.

FIG. 8 is a diagram illustrating an embodiment 800 of separation of various symbols groups that may be employed in accordance with correlation processing and/or matched filter processing to manage frequency spectra use for wireless communications. This diagram shows a number of symbol groups extracted from a signal by a baseband processing circuitry 840. In this diagram, each of the respective symbol groups is separated by an integral number of symbol groups. In typical instances where each symbol group includes a same number of symbols, then each of the respective symbol groups is separated by an integral number of symbols as well.

The first symbols and second symbols described herein may be viewed as being different respective symbol groups that undergo various types of processing (e.g., such as within an embodiment of a baseband processing circuitry). At one time, the symbol group 1 and the symbol group 2 undergo processing. At another time, the symbol group 1 and the symbol group 3 undergo processing. As can be seen, there may be different distances or groups of symbols that undergo various types of processing.

Figure 9:
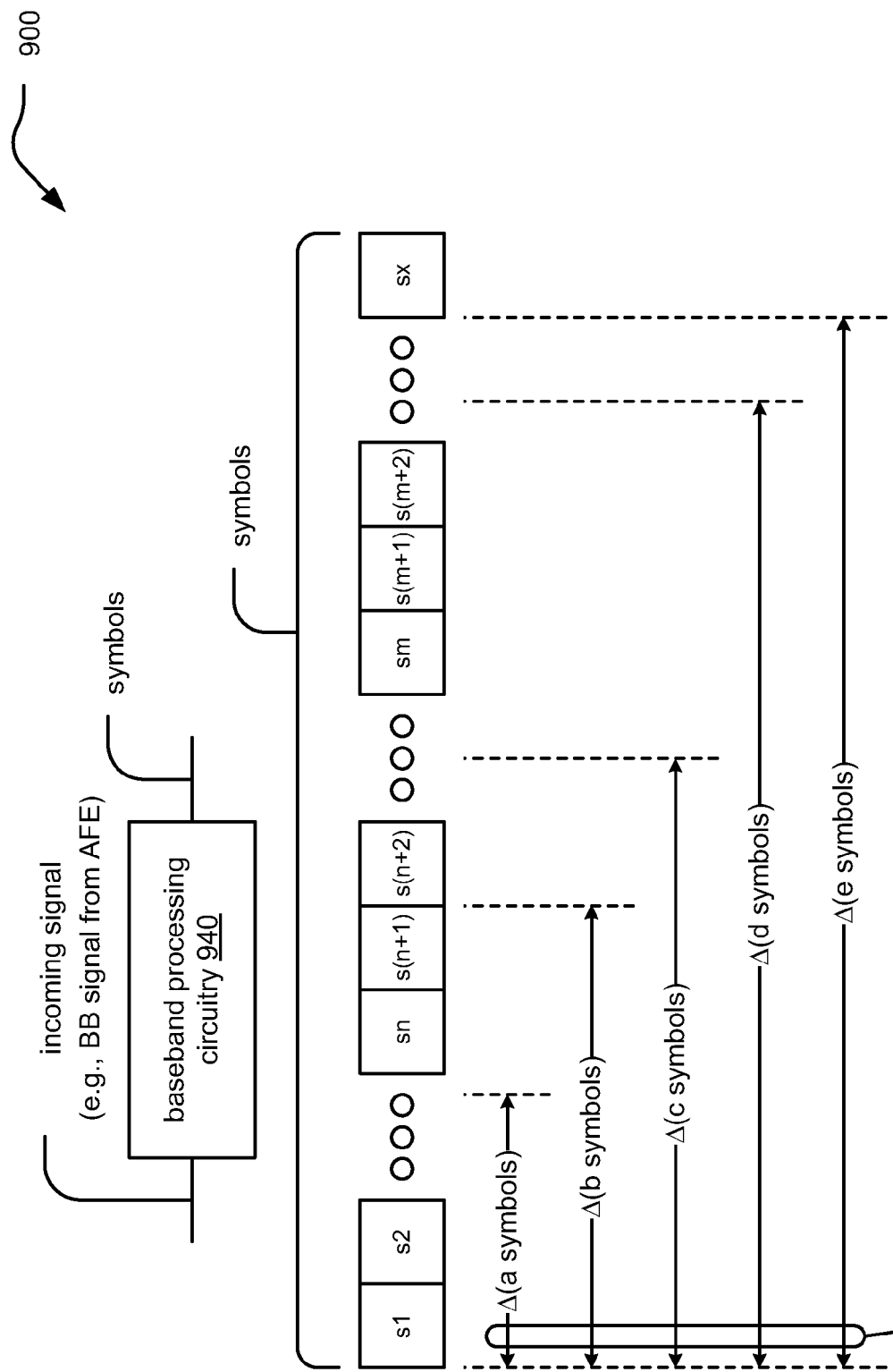
FIG. 9 is a diagram illustrating an alternative embodiment of separation of various symbols groups that may be employed in accordance with correlation processing and/or matched filter processing to manage frequency spectra use for wireless communications.

FIG. 9 is a diagram illustrating an alternative embodiment 900 of separation of various symbols groups that may be employed in accordance with correlation processing and/or matched filter processing to manage frequency spectra use for wireless communications. This diagram shows a number of symbol groups extracted from a signal by a baseband processing circuitry 940. In this diagram, each of the respective symbol groups is not necessarily separated by an integral number of symbol groups.

Among the various symbols depicted in this diagram, various symbol groups may be extracted and generated there from. The first symbols and second symbols described in this embodiment (and others) may be viewed as being different respective symbol groups that undergo various types of processing (e.g., such as within an embodiment of a baseband processing circuitry). The various symbol groups that undergo processing need not be separated by one another by an integral number of symbol groups. The various symbol groups that undergo processing may be separated by as few as one symbol (e.g., and may include some overlap).

Figure 10:
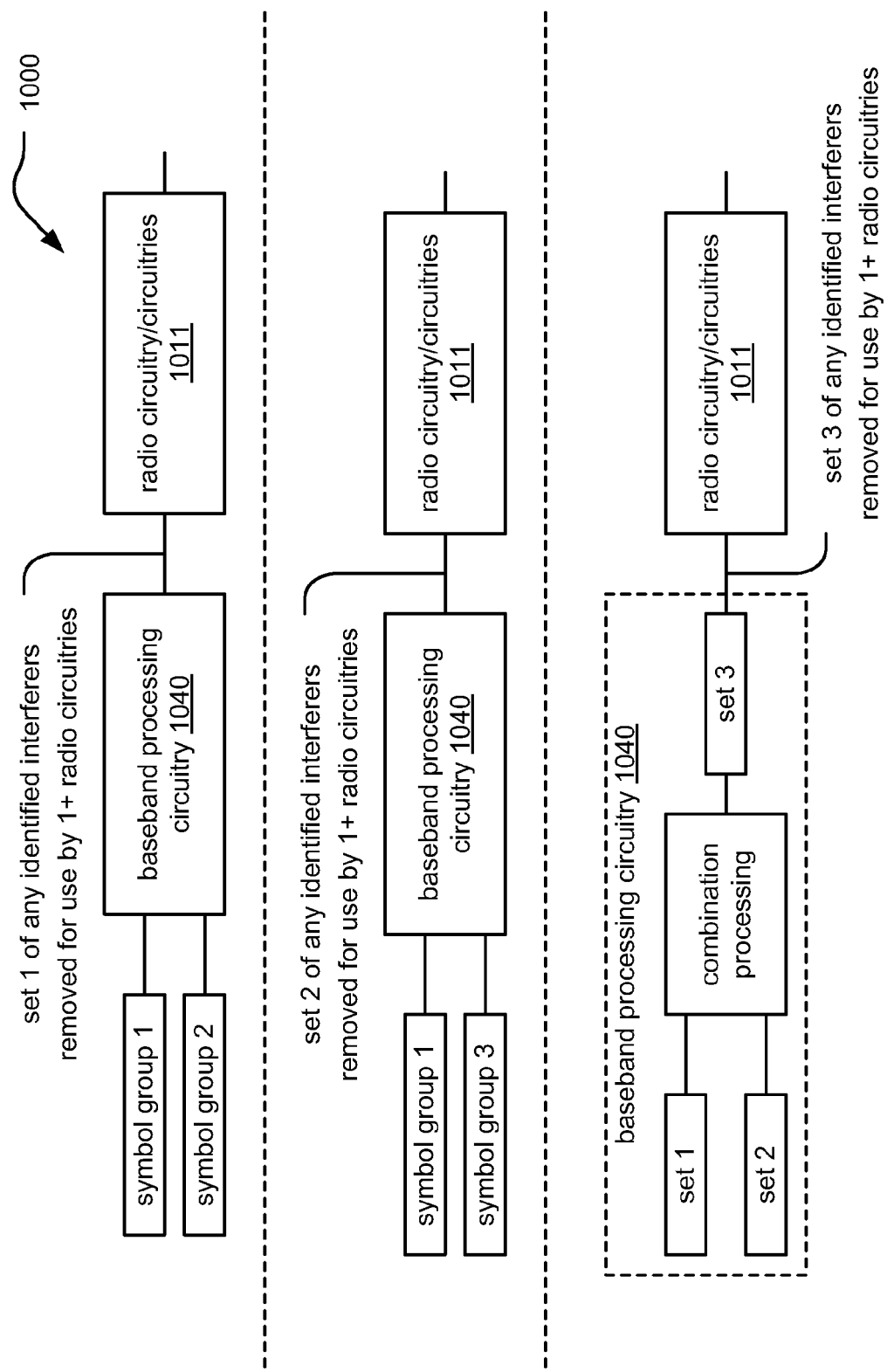
FIG. 10 is a diagram illustrating an embodiment of various symbols groups undergoing processing within a wireless communication device to manage frequency spectra use for wireless communications.

FIG. 10 is a diagram illustrating an embodiment 1000 of various symbols groups undergoing processing within a wireless communication device to manage frequency spectra use for wireless communications. A baseband processing circuitry 1040 is operative to process a symbol group 1 and a symbol group 2 to generate a set 1 of any identified interferers removed for use by one or more radio circuitries 1011. The same baseband processing circuitry 1040 is operative to process a symbol group 1 and a symbol group 3 (e.g., different than the symbol group 2) to generate a set 2 of any identified interferers removed for use by one or more radio circuitries 1011.

Thereafter, the baseband processing circuitry 1040 is operative to perform combination processing of each of the set 1 and the set 2 thereby generating a set 3 of any identified interferers removed for use by one or more radio circuitries 1011. It is noted that any of a variety of means of combination in which the set 1 and the set 2 may be combined (e.g., weighted combination, averaging, etc.) without departing from the scope and spirit of the invention.

Figure 11:
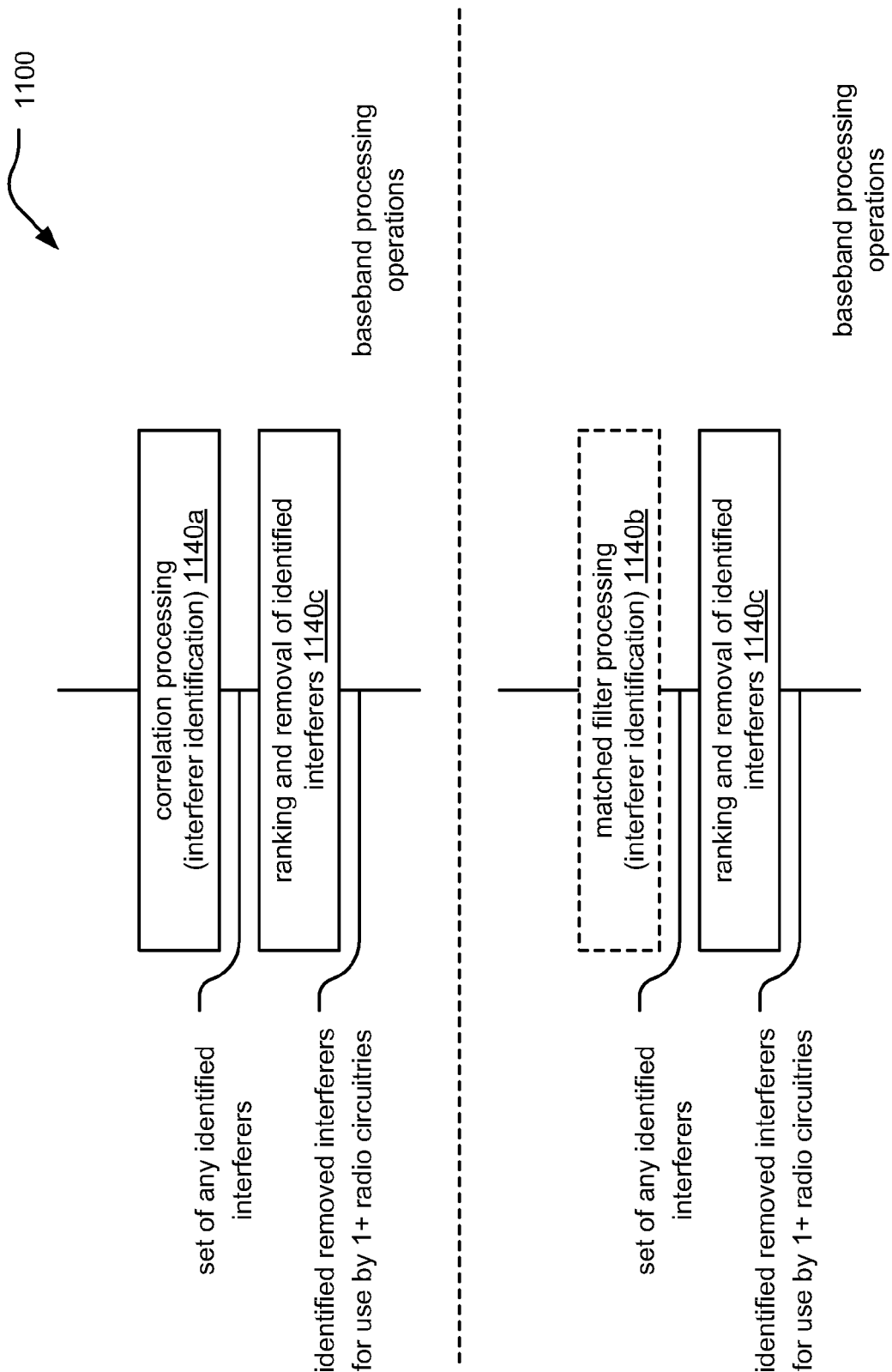
FIG. 11 is a diagram illustrating an embodiment of baseband processing operations within a wireless communication device to manage frequency spectra use for wireless communications.

FIG. 11 is a diagram illustrating an embodiment 1100 of baseband processing operations within a wireless communication device to manage frequency spectra use for wireless communications. A baseband processing circuitry may be implemented and operative to perform correlation processing (1140a) on a symbol group 1 and a symbol group 2 to generate a set of any identified interferers removed for use by one or more radio circuitries. Based on this set of any identified interferers, the baseband processing circuitry may be implemented to perform ranking and removal of identified interferers (block 1140c).

Alternatively, a baseband processing circuitry may be implemented and operative to perform matched filter processing (1140b) on a symbol group 1 and a symbol group 2 to generate a set of any identified interferers removed for use by one or more radio circuitries. Based on this set of any identified interferers, the baseband processing circuitry may be implemented to perform ranking and removal of identified interferers (block 1140c).

Figure 12:
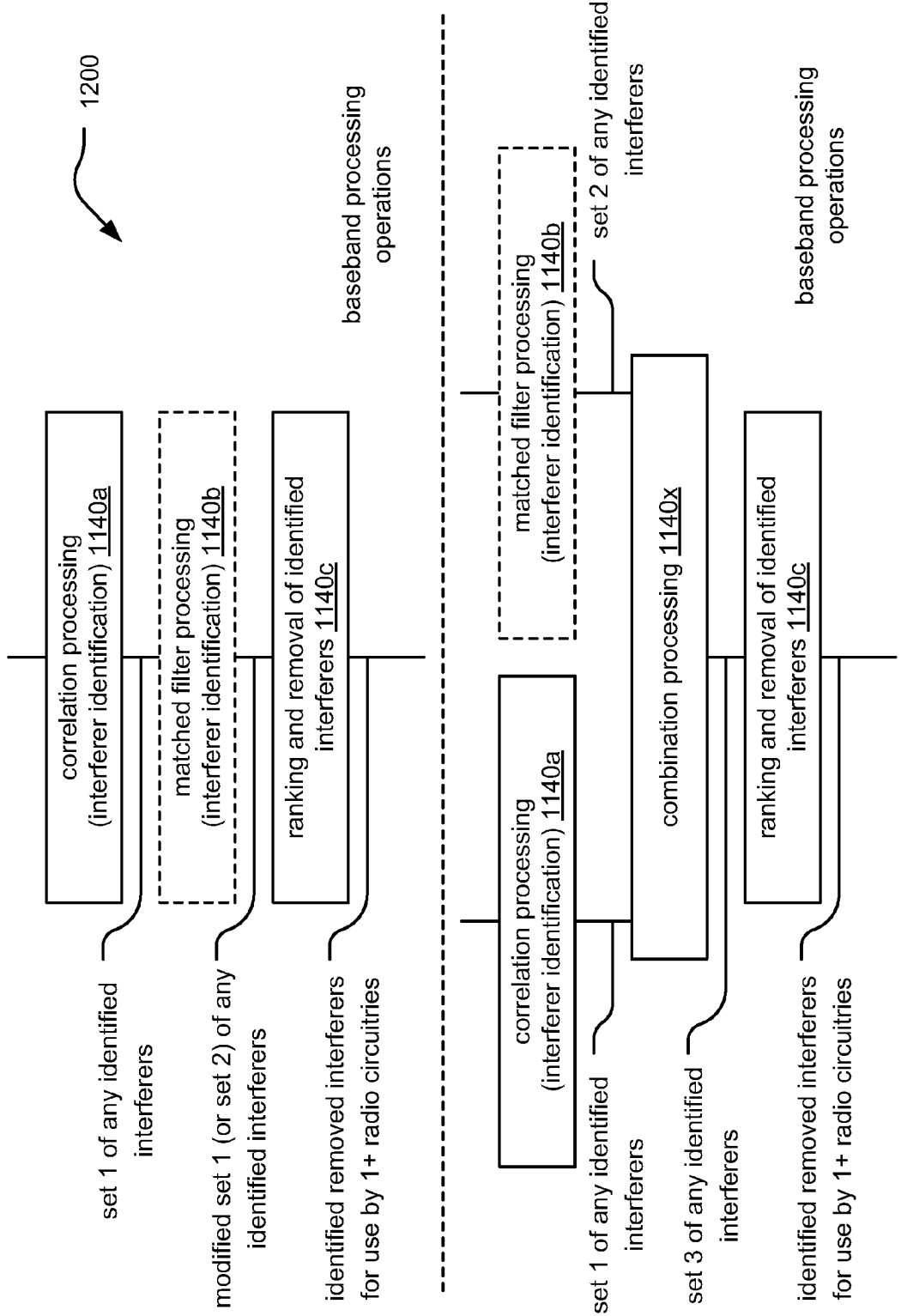
FIG. 12 is a diagram illustrating an alternative embodiment of baseband processing operations within a wireless communication device to manage frequency spectra use for wireless communications.

FIG. 12 is a diagram illustrating an alternative embodiment 1200 of baseband processing operations within a wireless communication device to manage frequency spectra use for wireless communications. A baseband processing circuitry may be implemented and operative to perform correlation processing (1140a) on a symbol group 1 and a symbol group 2 to generate a set 1 of any identified interferers removed for use by one or more radio circuitries. Thereafter, the baseband processing circuitry may be implemented and operative to perform matched filter processing (1140b) to generate a set 2 of any identified interferers removed for use by one or more radio circuitries. In some instances, this matched filter processing may be implemented to modify the set 1 in generating the set 2. Based on this set 2 of any identified interferers, the baseband processing circuitry may be implemented to perform ranking and removal of identified interferers (block 1140c).

In another embodiment, a baseband processing circuitry may be implemented and operative to perform correlation processing (1140a) on a symbol group 1 and a symbol group 2 to generate a set 1 of any identified interferers removed for use by one or more radio circuitries. Also, a baseband processing circuitry may be implemented and operative to perform matched filter processing (1140b) on a symbol group 1 and a symbol group 2 to generate a set 2 of any identified interferers removed for use by one or more radio circuitries. Thereafter, such a baseband processing circuitry is operative to perform combination processing (block 1140x) of each of the set 1 and the set 2 thereby generating a set 3 of any identified interferers removed for use by one or more radio circuitries. Again, it is noted that any of a variety of means of combination in which the set 1 and the set 2 may be combined (e.g., weighted combination, averaging, etc.) without departing from the scope and spirit of the invention.

FIG. 13, FIG. 14A, FIG. 14B, FIG. 15A, FIG. 15B, FIG. 16A, and FIG. 16B, illustrates various embodiments of methods that may be performed within a wireless communication device to process received communications and to manage the frequency spectra use for such communications.

Referring to method 1300 of FIG. 13A, the method 1300 begins by supporting first communications comporting with a first communication protocol, as shown in a block 1310. The method 1300 continues by supporting second communications comporting with a second communication protocol, as shown in a block 1320. The method 1300 then operates by processing the second communications comporting with the second communication protocol thereby extracting first symbols and second symbols there from, as shown in a block 1330. The operations of the blocks 1310, 1320, and 1330 are generally depicted as being the operations of the block 1301.

The method 1300 continues by perform correlation processing (e.g., auto-correlation, time domain based) using the first symbols and the second symbols in accordance with identifying interferers/metrics, such that each metric corresponds to one interferer (one to one correspondence), as shown in a block 1340.

The method 1300 then operates by ranking the interferers based on their corresponding metrics, as shown in a block 1350. Then, based on the rank of the interferers, the method 1300 continues by removing at least one frequency associated with at least one interferer from use by the first radio circuitry to support the first communications, as shown in a block 1360.

Figure 13:
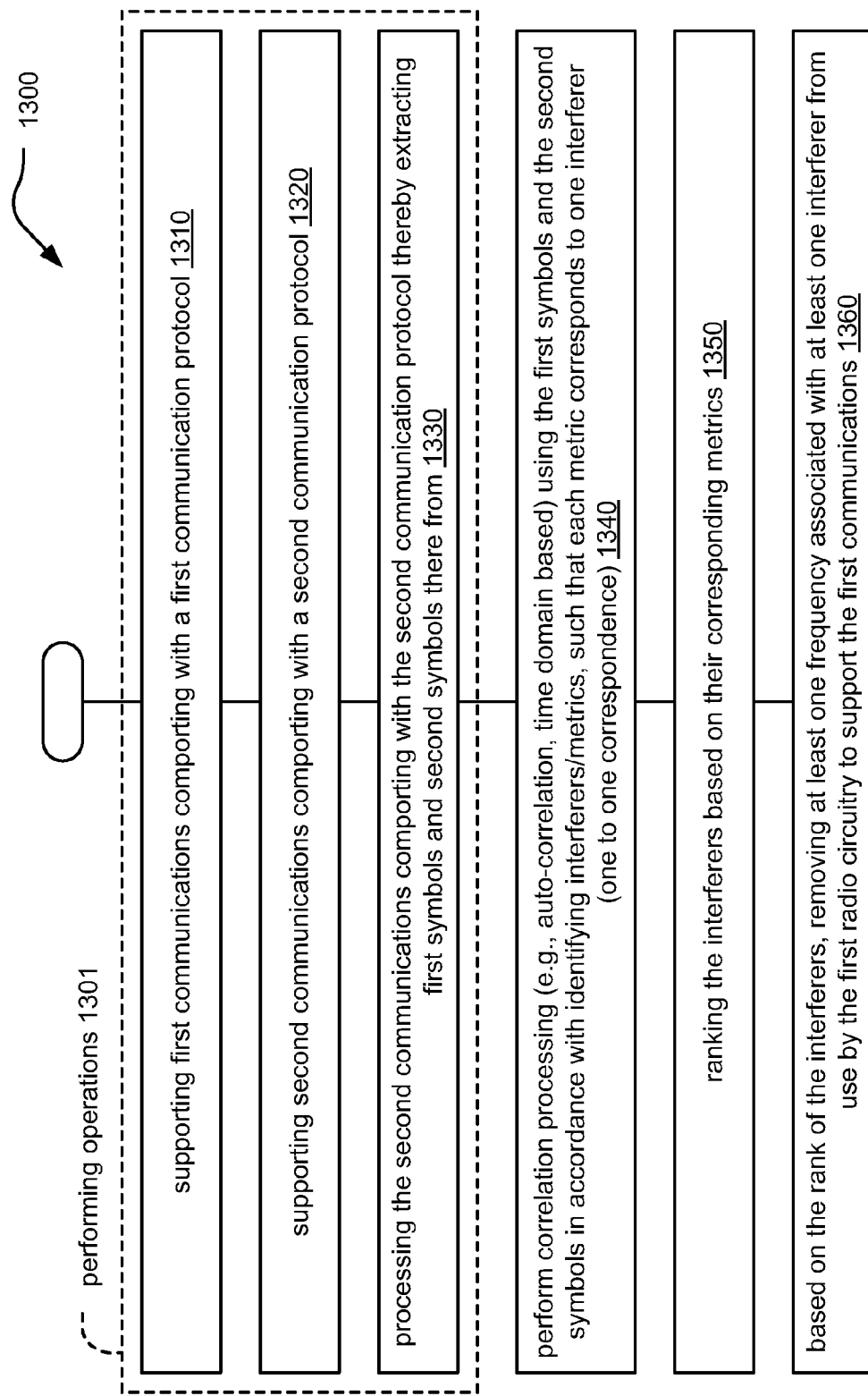

Referring to method 1400 of FIG. 14A, the method 1400 begins by performing the operations depicted in block 1301 in FIG. 13.

The method 1400 continues by performing correlation processing using the first symbols and the second symbols in accordance with identifying first interferers/first metrics (one to one correspondence), as shown in a block 1420. The method 1400 then operates by performing matched filter processing (e.g., Barker) using the first symbols and the second symbols in accordance with identifying second interferers/second metrics (one to one correspondence), as shown in a block 1430.

The method 1400 continues by processing the first interferers/first metrics and the second interferers/second metrics thereby identifying third interferers/third metrics (one to one correspondence) (e.g., combination processing), as shown in a block 1440.

Based on the third interferers/third metrics, the method 1400 continues by removing at least one frequency associated with at least one interferer from use by the first radio circuitry to support the first communications, as shown in a block 1450.

Referring to method 1401 of FIG. 14B, the method 1401 begins by performing the operations depicted in block 1301 in FIG. 13.

The method 1401 then operates by performing correlation processing using the first symbols and the second symbols (separate from first symbols by first distance/first number of symbols) in accordance with identifying first interferers/first metrics (one to one correspondence), as shown in a block 1421.

The method 1401 continues by performing correlation processing using the first symbols and the third symbols (separate from first symbols by second distance/second number of symbols) in accordance with identifying second interferers/second metrics (one to one correspondence), as shown in a block 1431.

The method 1401 continues by performing the operations 1440 and 1450 depicted in FIG. 14A.

Referring to method 1500 of FIG. 15A, the method 1500 begins by performing the operations depicted in block 1301 in FIG. 13.

The method 1500 continues by performing matched filter processing (e.g., Barker) using the first symbols and the second symbols (separate from first symbols by first distance/first number of symbols) in accordance with identifying first interferers/first metrics (one to one correspondence), as shown in a block 1520.

The method 1500 then operates by performing matched filter processing (e.g., Barker) using the first symbols and the third symbols (separate from first symbols by second distance/second number of symbols) in accordance with identifying second interferers/second metrics (one to one correspondence), as shown in a block 1530.

The method 1500 continues by performing the operations 1440 and 1450 depicted in FIG. 14A.

Referring to method 1501 of FIG. 15B, the method 1501 begins by performing the operations depicted in block 1301 in FIG. 13.

The method 1501 then operates by identifying an interfering STA thereby alerting to existence of corresponding WLAN (e.g., identifying WLAN), as shown in a block 1521. In certain embodiments, this operation may involve listening for OFDM preambles (concurrent with listening for beacons [e.g., DSSS preambles]), as shown in a block 1521a. In embodiments that perform listening for OFDM preambles as opposed to listening only for beacons, the process of identifying interferers can be performed much quicker, especially in instances where a significant amount of Bluetooth activity is ongoing (e.g., which may require the detection process to park at each WLAN center frequency for a much longer time to discriminate if there are beacons on that frequency versus if there is no Bluetooth activity there).

In other words, by performing monitoring and detection to identify a STA operating within a particular vicinity, then this can alert to the existence of a WLAN that is in fact operating within that vicinity. In most WLAN situations that operate in accordance a the infrastructure WLAN network (e.g., excluding the seldom used ad-hoc WLAN network), an AP is implemented within such a WLAN. As such, when a STA is detected within the vicinity (e.g., indicating that a WLAN is detected), then a reasonably high confidence associated with the existence of an AP of that WLAN may also be deduced. Also, in some embodiments, when an OFDM preamble is detected, this operation of identifying an interfering STA may also involve continuing to listen on that channel associated with that identified, interfering STA in the expectation to receive beacon from associated AP, as shown in a block 1521*b*. Based on identified WLAN, the method 1501 then operates by selectively removing at least one frequency associated with at least one interferer (e.g., AP and/or STA) from use by a radio circuitry to support communications, as shown in a block 1541.

As may be seen, in addition to listening only for beacons being transmitted from an AP within a WLAN, addition detection may also be performed by listening for and detecting OFDM preambles. By also listening for OFDM preambles in addition to listening for beacons transmitted from APs, the detection process may be sped up significantly. Also, because WLAN packets (that include the OFDM preambles) tend to be transmitted at relatively high rates and tend to be relatively short in duration (e.g., a few micro-seconds), a significantly increased number of opportunities are presented to detect WLAN occupancy on a particular WLAN center frequency in accordance with OFDM preamble detection functionality as compared to listening only to beacons [e.g., DSSS preambles].

In addition, it is noted that the performing of OFDM preamble detection may also be applicable for assisting in locating beacons for purposes of location based services (LBSs) [e.g., as described in the various patent applications claimed priority to and incorporated by reference herein above and being entitled, "Hybrid location determination for wireless communication device"]. As may be seen, by firstly identifying a WLAN and an associated AP, then the subsequent determination of what services may be provided via such an AP (or within such a WLAN) may be easier.

Referring to method 1600 of FIG. 16A, the method 1600 begins by performing the operations depicted in block 1301 in FIG. 13.

The method 1600 continues by identifying interferers, as shown in a block 1620. The method 1600 then operates by ranking interferers (e.g., relatively against all interferers, against predetermined/adaptively determined parameter(s), or using one or more other criterion), as shown in a block 1630.

The method 1600 continues by selectively removing at least one frequency associated with at least one interferer from use by a radio circuitry to support communications, as shown in a block 1640.

The method 1600 then operates by re-identifying/updating interferers, as shown in a block 1650. The method 1600 continues by selectively modifying frequency assignment (e.g., re-admit previously removed frequency, remove one or more other frequencies, etc.) for use by the radio circuitry to support communications, as shown in a block 1660.

It is noted that the frequency assignment may be updated/modified any number of times and in response to any number of considerations (e.g., passage of a period of time, change in operating conditions, etc.). The operations of monitoring and modifying the frequency assignment may be viewed as a continuous loop in some embodiments, where the frequency assignment is continually monitored and updated.

Referring to method 1601 of FIG. 16B, the method 1601 begins by performing the operations depicted in block 1301 in FIG. 13.

The method 1601 then operates by identifying first interferers/first metrics and second interferers/the second metrics, as shown in a block 1621.

The method 1601 continues by performing weighted combination of first interferers/first metrics and second interferers/second metrics thereby identifying third interferers/third metrics (one to one correspondence), as shown in a block 1631. In some embodiments, the operation of the block 1630 is operative to employ predetermined weights in accordance with the weighted combination, as shown in a block 1631*a*. Alternatively, in other embodiments, the operation of the block 1630 is operative to employ adaptively determined (and updated) weights in accordance with the weighted combination, as shown in a block 1631.

Based on the third interferers/third metrics, the method 1601 then operates by removing at least one frequency associated with at least one interferer from use by the radio circuitry to support communications, as shown in a block 1641.

It is noted that the various modules and/or circuitries (e.g., baseband processing circuitries, radio circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
a first radio circuitry that is operative to support first communications comporting with a first communication protocol;
a second radio circuitry that is operative to support second communications comporting with a second communication protocol; and
a baseband processing circuitry, coupled to the first radio circuitry and the second radio circuitry, that is operative to process the second communications comporting with the second communication protocol to extract a first plurality of symbols and a second plurality of symbols there from; and wherein:
the baseband processing circuitry, that includes a matched filter processing module, is operative to:
perform correlation processing using the first plurality of symbols and the second plurality of symbols and employ the matched filter processing module to process the first plurality of symbols and the second plurality of symbols in accordance with identifying a plurality of interferers and a plurality of metrics, such that each of the plurality of metrics corresponds to one of the plurality of interferers; and
based on the output of correlation processing and matched filter processing of the plurality of interferers, remove at least one frequency associated with at least one of the plurality of interferers from use by the first radio circuitry to support the first communications.

2. The apparatus of claim 1, wherein the baseband processing circuitry further comprising:
a correlation processing module that is operative to perform correlation processing using the first plurality of symbols and the second plurality of symbols in accordance with identifying the plurality of interferers and the plurality of metrics.

3. The apparatus of claim 1, wherein:
the first communication protocol is a Bluetooth communication protocol; and
the second communication protocol is a wireless local area network (WLAN) communication protocol.

4. The apparatus of claim 1, wherein:
within the second communications, the second plurality of symbols is located a predetermined number of symbols away from the first plurality of symbols.

5. The apparatus of claim 1, wherein:
the baseband processing circuitry is operative to process third communications, supported using the first radio circuitry or the second circuitry, to extract a third plurality of symbols and a fourth plurality of symbols there from; and
within the third communications, the third plurality of symbols is located a predetermined number of symbols away from the fourth plurality of symbols.

6. The apparatus of claim 1, wherein:
within the second communications, the second plurality of symbols is located a first predetermined number of symbols away from the first plurality of symbols;
the baseband processing circuitry is operative to process third communications, supported using the first radio circuitry or the second circuitry, to extract a third plurality of symbols and a fourth plurality of symbols there from; and
within the third communications, the third plurality of symbols is located a second predetermined number of symbols away from the fourth plurality of symbols.

7. The apparatus of claim 1, wherein:
the at least one frequency associated with the at least one of the plurality of interferers is employed by a wireless station (STA); and
based on identification of the at least one frequency employed by the STA, the baseband processing circuitry is operative to detect a wireless local area network (WLAN) in which the STA operates.

8. The apparatus of claim 1, wherein:
the at least one frequency associated with the at least one of the plurality of interferers is employed by a wireless station (STA);
based on identification of the at least one frequency employed by the STA, the baseband processing circuitry is operative to monitor the at least one frequency for a wireless local area network (WLAN) beacon transmitted from a WLAN access point (AP).

9. The apparatus of claim 1, wherein:
the first radio receiver circuitry, the second radio receiver circuitry, and the baseband processing circuitry are implemented within a single integrated circuit.

10. The apparatus of claim 1, wherein:
the first radio circuitry is a Bluetooth receiver circuitry; and
the second radio circuitry is a wireless local area network (WLAN) transceiver circuitry.

11. The apparatus of claim 1, wherein:
the second radio circuitry is a wireless local area network (WLAN) receiver circuitry; and
the second communications comporting with the second communication protocol include a WLAN beacon transmitted from a WLAN access point (AP).

12. The apparatus of claim 1, wherein:
the second radio circuitry is a wireless local area network (WLAN) receiver circuitry; and
the second communications comporting with the second communication protocol are associated with a wireless station (STA).

13. An apparatus, comprising:
a first radio circuitry that is operative to support first communications comporting with a first communication protocol;
a second radio circuitry that is operative to support second communications comporting with a second communication protocol; and
a baseband processing circuitry, coupled to the first radio circuitry and the second radio circuitry, that is operative to process the second communications comporting with the second communication protocol to extract a first plurality of symbols and a second plurality of symbols there from; and wherein:
the baseband processing circuitry includes a correlation processing module and a matched filter processing module;
the correlation processing module is operative to perform correlation processing using the first plurality of symbols and the second plurality of symbols in accordance with identifying a plurality of interferers and a plurality of metrics, such that each of the plurality of metrics corresponds to one of the plurality of interferers;

the matched filter processing module is operative to process the first plurality of symbols and the second plurality of symbols in accordance with the identifying the plurality of interferers and the plurality of metrics;

the baseband processing circuitry is operative to rank the plurality of interferers based on the plurality of metrics; and based on the rank of the plurality of interferers, the baseband processing circuitry is operative to remove at least one frequency associated with at least one of the plurality of interferers from use by the first radio circuitry to support the first communications.

14. The apparatus of claim 13, wherein:

within the second communications, the second plurality of symbols is located a first predetermined number of symbols away from the first plurality of symbols;

the baseband processing circuitry is operative to process third communications, supported using the first radio circuitry or the second circuitry, to extract a third plurality of symbols and a fourth plurality of symbols there from; and within the third communications, the third plurality of symbols is located a second predetermined number of symbols away from the fourth plurality of symbols.

15. The apparatus of claim 13, wherein:

the at least one frequency associated with the at least one of the plurality of interferers is employed by a wireless local area network (WLAN) access point (AP).

16. The apparatus of claim 13, wherein:

the at least one frequency associated with the at least one of the plurality of interferers is employed by a wireless station (STA).

17. The apparatus of claim 13, wherein:

the first radio circuitry is a Bluetooth receiver circuitry; and the second radio circuitry is a wireless local area network (WLAN) transceiver circuitry.

18. An apparatus, comprising:

a first radio circuitry that is operative to support first communications comporting with a first communication protocol;

a second radio circuitry that is operative to support second communications comporting with a second communication protocol; and a baseband processing circuitry, coupled to the first radio circuitry and the second radio circuitry, that is operative to process the second communications comporting with the second communication protocol to extract a first plurality of symbols and a second plurality of symbols there from; and wherein:

the baseband processing circuitry, that includes a matched filter processing module, is operative to:

perform correlation processing using the first plurality of symbols and the second plurality of symbols and employ the matched filter processing module to process the first plurality of symbols and the second plurality of symbols in accordance with identifying a plurality of interferers and a plurality of metrics, such that each of the plurality of metrics corresponds to one of the plurality of interferers;

based on the output of correlation processing and matched filter processing of the plurality of interferers, remove a plurality of frequencies associated with a plurality of interferers from use by the first radio circuitry to support the first communications; and within the second communications, the second plurality of symbols is located a first predetermined number of symbols away from the first plurality of symbols;

the baseband processing circuitry is operative to process third communications, supported using the first radio circuitry or the second circuitry, to extract a third plurality of symbols and a fourth plurality of symbols there from; and within the third communications, the third plurality of symbols is located a second predetermined number of symbols away from the fourth plurality of symbols.

19. The apparatus of claim 18, wherein:

a first of the plurality of frequencies associated with the plurality of interferers is employed by a wireless local area network (WLAN) access point (AP); and a second of the plurality of frequencies associated with the plurality of interferers is employed by a wireless station (STA).

20. The apparatus of claim 18, wherein:

the first radio circuitry is a Bluetooth receiver circuitry; and the second radio circuitry is a wireless local area network (WLAN) transceiver circuitry.

* * * * *